US011645665B2

(12) United States Patent
Sheppard et al.

(10) Patent No.: US 11,645,665 B2
(45) **Date of Patent: *May 9, 2023**

(54) REDUCING PROCESSING REQUIREMENTS TO CORRECT FOR BIAS IN RATINGS DATA HAVING INTERDEPENDENCIES AMONG DEMOGRAPHIC STATISTICS

(71) Applicant: The Nielsen Company (US), LLC, New York, NY (US)

(72) Inventors: Michael Sheppard, Brooklyn, NY (US); Jonathan Sullivan, Natick, MA (US); Alejandro Terrazas, Santa Cruz, CA (US); Peter Lipa, Tucson, AZ (US); Albert Ronald Perez, Beaverton, OR (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,589

(22) Filed: Aug. 10, 2020

(65) Prior Publication Data

US 2020/0372527 A1 Nov. 26, 2020

Related U.S. Application Data

(63) Continuation of application No. 14/835,401, filed on Aug. 25, 2015, now Pat. No. 10,740,774.

(Continued)

(51) Int. Cl.

*G06Q 30/02* (2012.01)
*G06Q 30/0204* (2023.01)

(Continued)

(52) U.S. Cl.

CPC ..... *G06Q 30/0204* (2013.01); *G06Q 30/0201* (2013.01); *G06Q 30/0203* (2013.01)

(58) Field of Classification Search

CPC .......... G06Q 30/0201; G06Q 30/0203; G06Q 30/0204

(Continued)

(56) References Cited

U.S. PATENT DOCUMENTS 6,519,604 B1 2/2003 Acharya et al.
7,213,032 B2 5/2007 Mascarenha (Continued)

OTHER PUBLICATIONS

Increasing panel data accuracy: An application to Internet panels. Dreze, X., Kalyanam, K., Briggs, R. (2000).*

(Continued)

*Primary Examiner* — Timothy Padot
(74) *Attorney, Agent, or Firm* — Hanley, Flight & Zimmerman, LLC

(57) ABSTRACT

Examples apparatus disclosed herein are to determine a plurality of weights based on a data structure having elements corresponding to pairings of ones of a plurality of demographic partition statistics and ones of a plurality of baseline demographic statistics obtained for a target population, the demographic partition statistics corresponding to a plurality of demographic partitions of a sample population, a first element of the data structure to combine a first one of the demographic partition statistics with a first one of the baseline demographic statistics of the target population based on a first value corresponding to a numerator term of an expression and a second value corresponding to a denominator term of the expression, the weights corresponding respectively to the demographic partitions of the sample population. Disclosed example apparatus are also to adjust the attribute data based on the weights to determine ratings data for the target population.

20 Claims, 8 Drawing Sheets

Related U.S. Application Data

(60) Provisional application No. 62/192,919, filed on Jul. 15, 2015.

(51) Int. Cl.
*G06Q 30/0203* (2023.01)
*G06Q 30/0201* (2023.01)

(58) Field of Classification Search
USPC ........................................................ 705/7.33
See application file for complete search history.

(56) References Cited

U.S. PATENT DOCUMENTS

| | | | | |
|---|---|---|---|---|
| 7,444,655 | B2 | 10/2008 | Sardera | |
| 7,949,639 | B2 | 5/2011 | Hunt et al. | |
| 8,495,680 | B2 | 7/2013 | Bentolila et al. | |
| 8,639,692 | B2 | 1/2014 | Chen et al. | |
| 10,740,774 | B2 | 8/2020 | Sheppard et al. | |
| 2004/0243657 | A1* | 12/2004 | Goren | G06E 1/045 708/607 |
| 2005/0187972 | A1* | 8/2005 | Kruger | G06Q 30/0204 |
| 2008/0319829 | A1 | 12/2008 | Hunt et al. | |
| 2009/0094039 | A1* | 4/2009 | MacDonald | G11B 27/11 709/201 |
| 2009/0187520 | A1 | 7/2009 | Liu et al. | |
| 2012/0047020 | A1 | 2/2012 | Bagherjeiran et al. | |
| 2012/0072469 | A1* | 3/2012 | Perez | G06Q 30/0201 707/810 |
| 2012/0192214 | A1 | 7/2012 | Hunn et al. | |
| 2012/0209795 | A1 | 8/2012 | Glickman | |
| 2012/0239809 | A1* | 9/2012 | Mazumdar | H04L 67/01 709/224 |
| 2012/0260278 | A1* | 10/2012 | Lambert | H04H 60/66 725/9 |
| 2015/0089523 | A1* | 3/2015 | Volovich | H04N 21/44226 725/14 |

OTHER PUBLICATIONS

Market Structure, Program Diversity, and Radio Audience Size. Rogers, Robert P;Woodbury, John R. Contemporary Economic Policy; Jan. 1996; 14, 1; ProQuest Central. p. 81.*

United States Patent and Trademark Office, "Non-final Office Action," mailed in connection with U.S. Appl. No. 14/835,401, dated Sep. 14, 2018, 18 pages.

Baker et al., "AAPOR Report on Online Panels," Public Opinion Quarterly Advance Access, Oct. 20, 2010, 71 pages.

Caviglia-Harris et al., "Examining the Reliability of Survey Data with Remote Sensing and Geographic Information Systems to Improve Deforestation Modeling," The Review of Regional Studies, 35:2, 2005, 19 pages.

Velez-Reyes et al., "Information Processing and Extraction Group," retrieved from http://www.ece.uprm.edu/~mvelez/research/tcess/IPEG%202006.doc on Jan. 13, 2015, 20 pages.

United States Patent and Trademark Office, "Notice of Allowance," mailed in connection with U.S. Appl. No. 14/835,401, dated Mar. 30, 2020, 13 pages.

United States Patent and Trademark Office, "Non-final Office Action," mailed in connection with U.S. Appl. No. 14/835,401, dated Oct. 31, 2019, 16 pages.

United States Patent and Trademark Office, "Final Office Action," mailed in connection with U.S. Appl. No. 14/835,401, dated May 15, 2019, 22 pages.

Bojanczyk, "Numerical Sensitivity of Weight Vector Computation Methods in Array Signal Processing," School of Electrical and Computer Engineering, Cornell University, publication date unknown, electronic file dated Jan. 13, 2015, 4 pages.

* cited by examiner

REDUCING PROCESSING REQUIREMENTS TO CORRECT FOR BIAS IN RATINGS DATA HAVING INTERDEPENDENCIES AMONG DEMOGRAPHIC STATISTICS

RELATED APPLICATION(S)

This patent arises from a continuation of U.S. patent application Ser. No. 14/835,401 (now U.S. Pat. No. 10,740,774), which is titled "REDUCING PROCESSING REQUIREMENTS TO CORRECT FOR BIAS IN RATINGS DATA HAVING INTERDEPENDENCIES AMONG DEMOGRAPHIC STATISTICS," and which was filed on Aug. 25, 2015, which claims the benefit of U.S. Provisional Application Ser. No. 62/192,919, which is titled "REDUCING PROCESSING REQUIREMENTS TO CORRECT FOR BIAS IN RATINGS DATA HAVING INTERDEPENDENCIES AMONG DEMOGRAPHIC STATISTICS," and which was filed on Jul. 15, 2015. Priority to U.S. patent application Ser. No. 14/835,401 and U.S. Provisional Application Ser. No. 62/192,919 is claimed. U.S. patent application Ser. No. 14/835,401 and U.S. Provisional Application Ser. No. 62/192,919 are hereby incorporated herein by reference in their respective entireties.

FIELD OF THE DISCLOSURE

This disclosure relates generally to audience measurement and, more particularly, to reducing processing requirements to correct for bias in ratings data having interdependencies among demographic statistics.

BACKGROUND

Traditionally, audience measurement entities determine compositions of audiences exposed to media by monitoring registered panel members and extrapolating their behavior onto a larger, target population of interest. That is, an audience measurement entity enrolls people that consent to being monitored into a panel and collects relatively highly accurate demographic information from those panel members via, for example, in-person, telephonic, and/or online interviews. The audience measurement entity then monitors those panel members to determine media exposure information describing media (e.g., television programs, radio programs, movies, streaming media, etc.) exposed to those panel members. By combining the media exposure information with the demographic information for the panel members, and extrapolating the result to the target population, the audience measurement entity can determine detailed ratings data identifying, for example, targeted demographic markets for different media. However, the composition of a panel may over-represent and/or under-represent different demographic groups of the target population, thereby leading to bias in the resulting ratings data.

More recent techniques employed by audience measurement entities to monitor exposure to Internet accessible media or, more generally, online media attempt to reduce such bias by expanding the available set of monitored individuals to a sample population that may include individuals who are registered panel members, as well as individuals who are not registered panel members. In some such techniques, demographic information for the monitored individuals can be obtained from one or more database proprietors (e.g., social network sites, multi-service sites, online retailer sites, credit services, etc.) with which the individuals subscribe to receive one or more online services. The audience measurement entity may then combine media exposure information with the demographic information obtained for these monitored individuals to determine ratings data for the sample population. Although such a sample population is typically larger than the panels employed by audience measurement entities, the resulting ratings data determined for the sample population may still have demographic statistics exhibiting bias relative to the corresponding demographic statistics of the target population.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
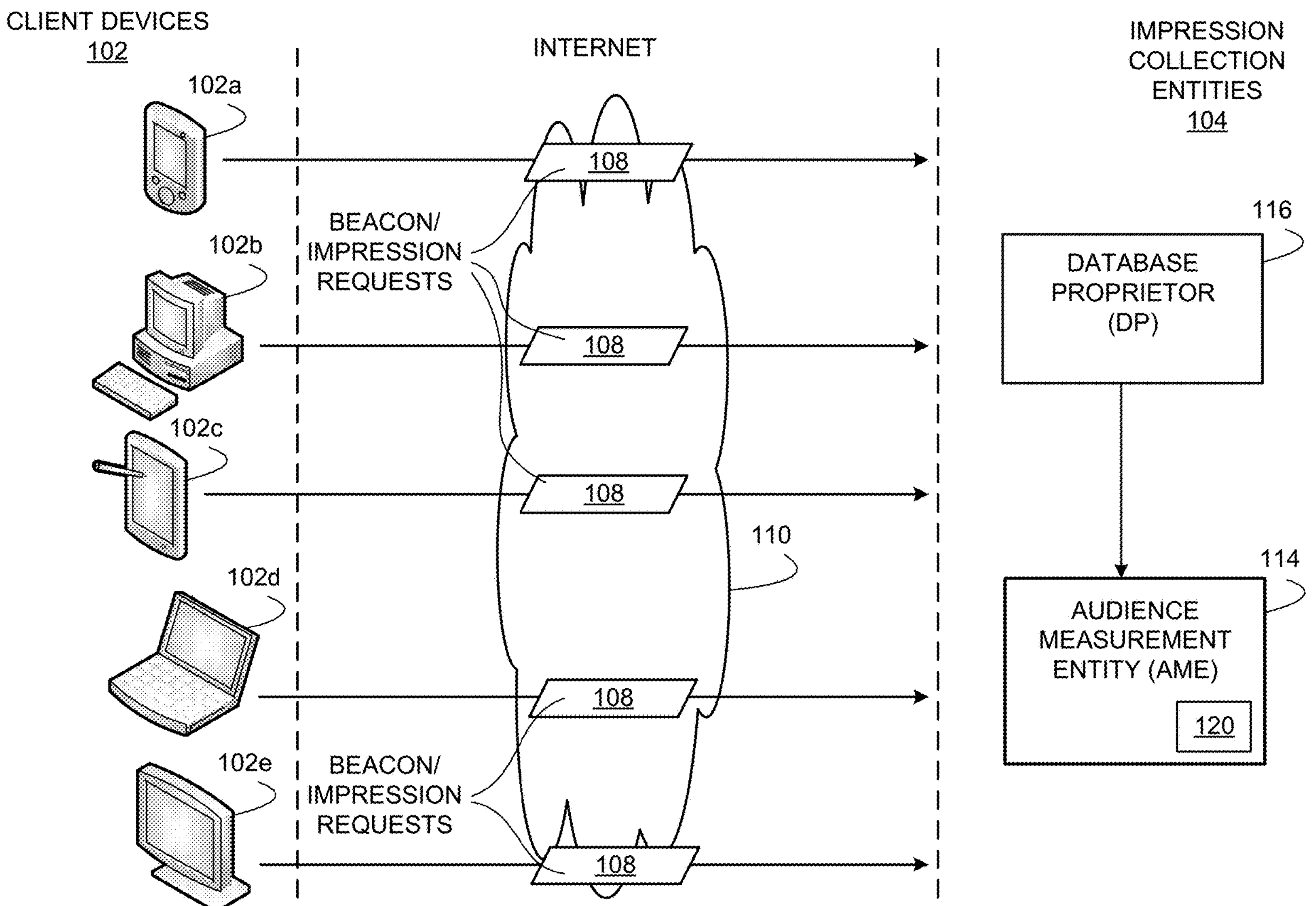
FIG. 1 illustrates example client devices that report audience impressions for Internet-based media to impression collection entities to facilitate identifying numbers of impressions and sizes of audiences exposed to different Internet-based media.

Methods, apparatus, systems and articles of manufacture (e.g., physical storage media) to correct for bias in ratings data having interdependencies among demographic statistics are disclosed herein. As noted above, ratings data determined for a sample population may have demographic statistics that exhibit bias relative to the corresponding demographic statistics of a target population to which the ratings data is to be applied. For example, some ratings campaigns (e.g., such as audience measurement campaigns, market research campaigns, etc.) divide a sample population into several different demographic categories (e.g., such as categories based on gender, age, income, mobile phone usage, etc.), and an individual in the population may belong to multiple of these demographic categories. A given ratings campaign may then involve determining ratings data (e.g., media exposure ratings data and/or other audience measurement data, market research ratings data, etc.) for individual demographic categories or combinations of such demographic categories for a sample population, and applying those ratings to a different (e.g., larger) target population. However, due to over-sampling and/or under-sampling of individuals belonging to the different demographic categories, the demographic statistics of the sample population may be biased relative to the corresponding demographic statistics of the target population.

Some prior audience measurement and/or market research systems (referred to herein as audience measurement systems) may employ simple scaling to correct for the bias between the demographic statistics of the sample population and the demographic statistics of the target population. Such simple scaling may involve emphasizing or deemphasizing the contribution of an individual to the sample population's ratings data by a scale factor chosen to adjust one particular demographic statistic of the sample population to match the corresponding demographic statistic of target population. However, such simple scaling does not account for the relationships between different demographic statistics. For example, a demographic statistic representing the probability of an individual being a mobile phone user given the individual is male is related to a demographic statistic representing the probability of an individual being male, as well as to a demographic statistic representing the probability of an individual being male and being a mobile phone user. Determining a scale factor that adjusts just one of those demographic statistics to account for a bias between the sample population and target population could exacerbate the bias between the other, related demographic statistics.

Accordingly, such prior techniques for correcting for bias between sample population and target population demographic statistics may require multiple processing iterations to settle on a scale factor that reduces the bias between the sample population statistics and the target population statistic of interest without unduly impacting the bias between the other, related demographic statistics. Such processing iterations may involve successively varying the scale factor and evaluating the resulting bias between the sample population statistic and target population statistic of interest, as well as the resulting impact on the biases between the other, related demographic statistics. In some examples, such iterative processing associated with prior techniques may not be able to yield a scale factor that both reduces the bias between the sample population statistics and the target population statistic of interest, and does not unduly impact the bias between the other, related demographic statistics.

Unlike such prior audience measurement systems, example methods, apparatus, systems and articles of manufacture (e.g., physical storage media) disclosed herein implement technical solutions to address technical problems associated with correcting for bias between the demographic statistics of a sample population and the corresponding demographic statistics of a target population when there are interdependencies between the different demographic statistics. More specifically, example technical solutions disclosed herein eliminate the need to successively iterate through scale factor adjustments by determining a set of weights that reduces the bias, as a whole, between a set of baseline demographic statistics determined for a sample population and a corresponding set of baseline demographic statistics known for a target population. Example technical solutions disclosed herein can then adjust (e.g., weight) demographic attributes associated with individuals of the sample population based on this set of weights to determine ratings data for the sample population that can be applied to the target population.

Advantageously, these example technical solutions reduce (or eliminate) the need to iterate through different adjustment values (e.g., the prior scale factors) to adjust the bias for interdependent demographic statistics. Instead of multiple iterations, example technical solutions disclosed herein can determine the set of weights that reduces the bias, as a whole, for interdependent statistics in a single processing pass, thereby improving processor efficiency. Furthermore, because the single processing iteration can determine a set of weights that reduces bias, as a whole, for interdependent statistics, such disclosed example technical solutions avoid the further inefficiencies of prior techniques, which may need to perform subsequent processing iterations to correct for errors (e.g., increased bias among some interdependent statistics) introduced by prior processing iterations.

For example, some example methods disclosed herein to correct for bias in ratings data include accessing information specifying a set of population strata (e.g., population partitions) having corresponding strata demographic statistics capable of being combined to determine a first set of baseline demographic statistics for a sample population that corresponds to a second set of baseline demographic statistics for a target population. Such disclosed example methods also include determining (e.g., in a first processing pass or, in other words, without the need to perform multiple processing iterations to correct for errors (e.g., increased biases) introduced by prior processing iterations), a set of weights corresponding respectively to the set of population strata that reduces bias between the second set of baseline demographic statistics for the target population and the first set of baseline demographic statistics for the sample population when the set of weights is applied to the strata demographic statistics to determine the first set of baseline demographic statistics for the sample population. Such disclosed example methods further include adjusting, based on the set of weights, attributes associated with individuals of the sample population to determine the ratings data.

In some disclosed examples, the population strata form a mutually exclusive set that covers the sample population. Additionally or alternatively, in some disclosed examples, the strata demographic statistics represent numbers of individuals from the sample population belonging to respective ones of the set of population strata.

Additionally or alternatively, in some disclosed example methods, determining the set of weights includes forming a matrix having matrix elements corresponding to pairings of ones of the strata demographic statistics and ones of the first set of baseline demographic statistics. For example, a first matrix element corresponding to a pairing of a first one of the strata demographic statistics and a first one of the first set of baseline demographic statistics may have a value based on a contribution of the first one of the strata demographic statistics to computation of the first one of the first set of baseline demographic statistics. Such disclosed example methods also include determining the set of weights based on the matrix. For example, some such disclosed example methods determine the set of weights to minimize an expression based on multiplying the matrix and a vector of the weights, but subject to a constraint that the weights have values greater than or equal to one.

Additionally or alternatively, in some disclosed example methods in which a first individual of the sample population is included in a first one of the population strata and a second individual of the sample population is included in a second one of the population strata, the example methods include scaling a contribution of an attribute associated with the first individual by a first one of the weights corresponding to the first one of the population strata to determine a first scaled attribute contribution. Some such disclosed example methods also include scaling a contribution of an attribute associated with the second individual by a second one of the weights corresponding to the second one of the population strata to determine a second scaled attribute contribution. Some such disclosed example methods further include combining the first scaled attribute contribution and the second scaled attribute contribution to determine the ratings data.

Additionally or alternatively, some disclosed example methods further include determining the strata demographic statistics from impressions collected by the processor in response to beacon request messages received by at least one of an audience measurement entity or a database provider. Additionally or alternatively, some disclosed example methods further include transmitting the ratings data at least one of electronically or optically from the processor to a receiving device via a network.

These and other example methods, apparatus, systems and articles of manufacture (e.g., physical storage media) to correct for bias in ratings data having interdependencies among demographic statistics are disclosed in greater detail below.

Turning to the figures, FIG. 1 illustrates example client devices 102 that report audience impressions for online (e.g., Internet-based) media to impression collection entities 104 to facilitate determining numbers of impressions and sizes of audiences exposed to different online media. An impression generally refers to an instance of an individual's (or household's) exposure to media (e.g., content, advertising, etc.). As used herein, the term impression collection entity refers to any entity that collects impression data, such as, for example, audience measurement entities and database proprietors that collect impression data.

The client devices 102 of the illustrated example may be any device capable of accessing media over a network. For example, the client devices 102 may be a computer, a tablet, a mobile device, a smart television, or any other Internet-capable device or appliance. Examples disclosed herein may be used to collect impression information for any type of media, including content and/or advertisements. Media may include advertising and/or content delivered via web pages, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s).

In the illustrated example, the client devices 102 employ web browsers and/or applications (e.g., apps) to access media, some of which include instructions that cause the client devices 102 to report media monitoring information to one or more of the impression collection entities 104. That is, when a client device 102 of the illustrated example accesses media, a web browser and/or application of the client device 102 executes one or more instructions (e.g., beacon instruction(s)) in the media, which cause the client device 102 to send a beacon request or impression request 108 to one or more impression collection entities 104 via, for example, the Internet 110. The beacon requests 108 of the illustrated example include information about accesses to media at the corresponding client device(s) 102 generating the beacon requests. Such beacon requests allow monitoring entities, such as the impression collection entities 104, to collect impressions for different media accessed via the client devices 102. In this manner, the impression collection entities 104 can generate large impression quantities for different media (e.g., different content and/or advertisement campaigns). Examples techniques for using beacon instructions and beacon requests to cause devices to collect impressions for different media accessed via client devices are further disclosed in at least U.S. Pat. No. 6,108,637 to Blumenau and U.S. Pat. No. 8,370,489 to Mainak, et al., which are incorporated herein by reference in their respective entireties.

The impression collection entities 104 of the illustrated example include an example audience measurement entity (AME) 114 and an example database proprietor (DP) 116. In the illustrated example, the AME 114 does not provide the media to the client devices 102 and is a trusted (e.g., neutral) third party (e.g., The Nielsen Company, LLC) for providing accurate media access statistics. In the illustrated example, the database proprietor 116 is one of many database proprietors that operate on the Internet to provide services to large numbers of subscribers. Such services may include, but are not limited to, email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, etc.), online retailer sites (e.g., Amazon.com, Buy.com, etc.), credit services (e.g., Experian), and/or any other web service(s) site that maintains user registration records. In examples disclosed herein, the database proprietor 116 maintains user account records corresponding to users registered for Internet-based services provided by the database proprietors. That is, in exchange for the provision of services, subscribers register with the database proprietor 116. As part of this registration, the subscribers provide detailed demographic information to the database proprietor 116. Demographic information may include, for example, gender, age, ethnicity, income, home location, education level, occupation, etc. In the illustrated example, the database proprietor 116 sets a device/user identifier (e.g., an identifier described below in connection with FIG. 2) on a subscriber's client device 102 that enables the database proprietor 116 to identify the subscriber.

In the illustrated example, when the database proprietor 116 receives a beacon/impression request 108 from a client device 102, the database proprietor 116 requests the client device 102 to provide the device/user identifier that the database proprietor 116 had previously set for the client device 102. The database proprietor 116 uses the device/user identifier corresponding to the client device 102 to identify demographic information in its user account records corresponding to the subscriber of the client device 102. In this manner, the database proprietor 116 can generate demographic impressions by associating demographic information with an audience impression for the media accessed at the client device 102. Thus, as used herein, a demographic impression is an impression that is associated with a characteristic (e.g., a demographic characteristic) of the person exposed to the media. Through the use of demographic impressions, which associate monitored (e.g., logged) impressions with demographic information, it is possible to measure media exposure and, by extension, infer media consumption behaviors across different demographic classifications (e.g., groups) of a sample population of individuals.

In the illustrated example, the AME 114 establishes a panel of users who have agreed to provide their demographic information and to have their Internet browsing activities monitored. When an individual joins the AME panel, the person provides detailed information concerning the person's identity and demographics (e.g., gender, age, ethnicity, income, home location, occupation, etc.) to the AME 114. The AME 114 sets a device/user identifier (e.g., an identifier described below in connection with FIG. 2) on the person's client device 102 that enables the AME 114 to identify the panelist.

In the illustrated example, when the AME 114 receives a beacon request 108 from a client device 102, the AME 114 requests the client device 102 to provide the AME 114 with the device/user identifier the AME 114 previously set for the client device 102. The AME 114 uses the device/user identifier corresponding to the client device 102 to identify demographic information in its user AME panelist records corresponding to the panelist of the client device 102. In this manner, the AME 114 can generate demographic impressions by associating demographic information with an audience impression for the media accessed at the client device 102.

In the illustrated example, the database proprietor 116 reports demographic impression data to the AME 114. To preserve the anonymity of its subscribers, the demographic impression data may be anonymous demographic impression data and/or aggregated demographic impression data. In the case of anonymous demographic impression data, the database proprietor 116 reports user-level demographic impression data (e.g., which is resolvable to individual subscribers), but with any personal identification information removed from or obfuscated (e.g., scrambled, hashed, encrypted, etc.) in the reported demographic impression data. For example, anonymous demographic impression data, if reported by the database proprietor 116 to the AME 114, may include respective demographic impression data for each device 102 from which a beacon request 108 was received, but with any personal identification information removed from or obfuscated in the reported demographic impression data. In the case of aggregated demographic impression data, individuals are grouped into different demographic classifications, and aggregate demographic impression data (e.g., which is not resolvable to individual subscribers) for the respective demographic classifications is reported to the AME 114. For example, aggregate demographic impression data, if reported by the database proprietor 116 to the AME 114, may include first demographic impression data aggregated for devices 102 associated with demographic information belonging to a first demographic classification (e.g., a first age group, such as a group which includes ages less than 18 years old), second demographic impression data for devices 102 associated with demographic information belonging to a second demographic classification (e.g., a second age group, such as a group which includes ages from 18 years old to 34 years old), etc.

In the illustrated example, the AME 114 includes an example rating bias corrector 120 to determine ratings data from the demographic impressions collected by the AME 114 and/or the database proprietor 116. The ratings data determined by the example rating bias corrector 120 can be any type of ratings data, such as ratings data quantifying (e.g., in terms of audience size, number of households, number of impressions, etc.) media exposure across different demographic classifications (e.g., groups) of the sample population. Moreover, and as disclosed in further detail below, the rating bias corrector 120 of the illustrated example corrects for bias in the ratings data in accordance with the teachings of this disclosure.

Figure 2:
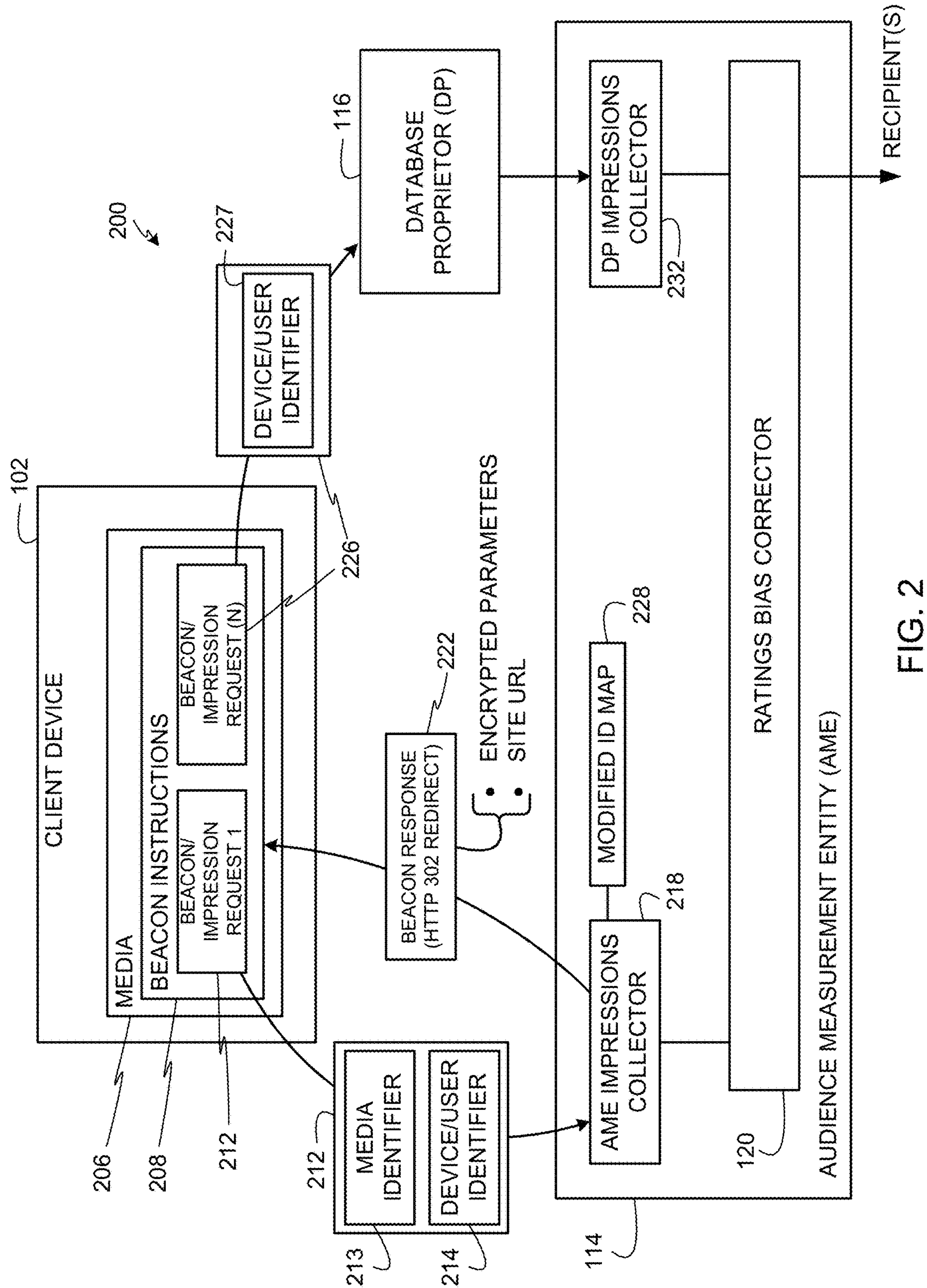
FIG. 2 is an example communication flow diagram illustrating an example manner in which an example audience measurement entity and an example database proprietor can collect impressions and demographic information associated with a client device, and can further correct for bias in ratings data having interdependencies among demographic statistics in accordance with the teachings of this disclosure.

FIG. 2 is an example communication flow diagram 200 illustrating an example manner in which the AME 114 and the database proprietor 116 can collect demographic impressions based on client devices 102 reporting impressions to the AME 114 and the database proprietor 116. FIG. 2 also shows the example rating bias corrector 120, which is able to correct for bias in ratings data having interdependencies among demographic statistics in accordance with the teachings of this disclosure. The example chain of events shown in FIG. 2 occurs when a client device 102 accesses media for which the client device 102 reports an impression to the AME 114 and/or the database proprietor 116. In some examples, the client device 102 reports impressions for accessed media based on instructions (e.g., beacon instructions) embedded in the media that instruct the client device 102 (e.g., that instruct a web browser or an app in the client device 102) to send beacon/impression requests (e.g., the beacon/impression requests 108 of FIG. 1) to the AME 114 and/or the database proprietor 116. In such examples, the media having the beacon instructions is referred to as tagged media. In other examples, the client device 102 reports impressions for accessed media based on instructions embedded in apps or web browsers that execute on the client device 102 to send beacon/impression requests (e.g., the beacon/impression requests 108 of FIG. 1) to the AME 114 and/or the database proprietor 116 for corresponding media accessed via those apps or web browsers. In some examples, the beacon/impression requests (e.g., the beacon/impression requests 108 of FIG. 1) include device/user identifiers (e.g., AME IDs and/or DP IDs) as described further below to allow the corresponding AME 114 and/or the corresponding database proprietor 116 to associate demographic information with resulting logged impressions.

In the illustrated example, the client device 102 accesses media 206 that is tagged with beacon instructions 208. The beacon instructions 208 cause the client device 102 to send a beacon/impression request 212 to an AME impressions collector 218 when the client device 102 accesses the media 206. For example, a web browser and/or app of the client device 102 executes the beacon instructions 208 in the media 206 which instruct the browser and/or app to generate and send the beacon/impression request 212. In the illustrated example, the client device 102 sends the beacon/impression request 212 using an HTTP (hypertext transfer protocol) request addressed to the URL (uniform resource locator) of the AME impressions collector 218 at, for example, a first Internet domain of the AME 114. The beacon/impression request 212 of the illustrated example includes a media identifier 213 (e.g., an identifier that can be used to identify content, an advertisement, and/or any other media) corresponding to the media 206. In some examples, the beacon/impression request 212 also includes a site identifier (e.g., a URL) of the website that served the media 206 to the client device 102 and/or a host website ID (e.g., www.acme.com) of the website that displays or presents the media 206. In the illustrated example, the beacon/impression request 212 includes a device/user identifier 214. In the illustrated example, the device/user identifier 214 that the client device 102 provides to the AME impressions collector 218 in the beacon impression request 212 is an AME ID because it corresponds to an identifier that the AME 114 uses to identify a panelist corresponding to the client device 102.

In other examples, the client device 102 may not send the device/user identifier 214 until the client device 102 receives a request for the same from a server of the AME 114 in response to, for example, the AME impressions collector 218 receiving the beacon/impression request 212.

In some examples, the device/user identifier 214 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore (where HTML is an abbreviation for hypertext markup language), and/or any other identifier that the AME 114 stores in association with demographic information about users of the client devices 102. In this manner, when the AME 114 receives the device/user identifier 214, the AME 114 can obtain demographic information corresponding to a user of the client device 102 based on the device/user identifier 214 that the AME 114 receives from the client device 102. In some examples, the device/user identifier 214 may be encrypted (e.g., hashed) at the client device 102 so that only an intended final recipient of the device/user identifier 214 can decrypt the hashed identifier 214. For example, if the device/user identifier 214 is a cookie that is set in the client device 102 by the AME 114, the device/user identifier 214 can be hashed so that only the AME 114 can decrypt the device/user identifier 214. If the device/user identifier 214 is an IMEI number, the client device 102 can hash the device/user identifier 214 so that only a wireless carrier (e.g., the database proprietor 116) can decrypt the hashed identifier 214 to recover the IMEI for use in accessing demographic information corresponding to the user of the client device 102. By hashing the device/user identifier 214, an intermediate party (e.g., an intermediate server or entity on the Internet) receiving the beacon request cannot directly identify a user of the client device 102.

In response to receiving the beacon/impression request 212, the AME impressions collector 218 logs an impression for the media 206 by storing the media identifier 213 contained in the beacon/impression request 212. In the illustrated example of FIG. 2, the AME impressions collector 218 also uses the device/user identifier 214 in the beacon/impression request 212 to identify AME panelist demographic information corresponding to a panelist of the client device 102. That is, the device/user identifier 214 matches a user ID of a panelist member (e.g., a panelist corresponding to a panelist profile maintained and/or stored by the AME 114). In this manner, the AME impressions collector 218 can associate the logged impression with demographic information of a panelist corresponding to the client device 102.

In some examples, the beacon/impression request 212 may not include the device/user identifier 214 if, for example, the user of the client device 102 is not an AME panelist. In some such examples, the AME impressions collector 218 logs impressions regardless of whether the client device 102 provides the device/user identifier 214 in the beacon/impression request 212 (or in response to a request for the identifier 214). When the client device 102 does not provide the device/user identifier 214, the AME impressions collector 218 can still benefit from logging an impression for the media 206 even though it does not have corresponding demographics. For example, the AME 114 may still use the logged impression to generate a total impressions count and/or a frequency of impressions (e.g., an impressions frequency) for the media 206. Additionally or alternatively, the AME 114 may obtain demographics information from the database proprietor 116 for the logged impression if the client device 102 corresponds to a subscriber of the database proprietor 116.

In the illustrated example of FIG. 2, to compare or supplement panelist demographics (e.g., for accuracy or completeness) of the AME 114 with demographics from one or more database proprietors (e.g., the database proprietor 116), the AME impressions collector 218 returns a beacon response message 222 (e.g., a first beacon response) to the client device 102 including an HTTP "302 Found" re-direct message and a URL of a participating database proprietor 116 at, for example, a second Internet domain. In the illustrated example, the HTTP "302 Found" re-direct message in the beacon response 222 instructs the client device 102 to send a second beacon request 226 to the database proprietor 116. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 226) to a participating database proprietor 116. In the illustrated example, the AME impressions collector 218 determines the database proprietor 116 specified in the beacon response 222 using a rule and/or any other suitable type of selection criteria or process. In some examples, the AME impressions collector 218 determines a particular database proprietor to which to redirect a beacon request based on, for example, empirical data indicative of which database proprietor is most likely to have demographic data for a user corresponding to the device/user identifier 214. In some examples, the beacon instructions 208 include a predefined URL of one or more database proprietors to which the client device 102 should send follow up beacon requests 226. In other examples, the same database proprietor is always identified in the first redirect message (e.g., the beacon response 222).

In the illustrated example of FIG. 2, the beacon/impression request 226 may include a device/user identifier 227 that is a DP ID because it is used by the database proprietor 116 to identify a subscriber of the client device 102 when logging an impression. In some instances (e.g., in which the database proprietor 116 has not yet set a DP ID in the client device 102), the beacon/impression request 226 does not include the device/user identifier 227. In some examples, the DP ID is not sent until the database proprietor 116 requests the same (e.g., in response to the beacon/impression request 226). In some examples, the device/user identifier 227 is a device identifier (e.g., an IMEI), an MEID, a MAC address, etc.), a web browser unique identifier (e.g., a cookie), a user identifier (e.g., a user name, a login ID, etc.), an Adobe Flash® client identifier, identification information stored in an HTML5 datastore, and/or any other identifier that the database proprietor 116 stores in association with demographic information about subscribers corresponding to the client devices 102. In some examples, the device/user identifier 227 may be encrypted (e.g., hashed) at the client device 102 so that only an intended final recipient of the device/user identifier 227 can decrypt the hashed identifier 227. For example, if the device/user identifier 227 is a cookie that is set in the client device 102 by the database proprietor 116, the device/user identifier 227 can be hashed so that only the database proprietor 116 can decrypt the device/user identifier 227. If the device/user identifier 227 is an IMEI number, the client device 102 can hash the device/user identifier 227 so that only a wireless carrier (e.g., the database proprietor 116) can decrypt the hashed identifier 227 to recover the IMEI for use in accessing demographic information corresponding to the user of the client device 102. By hashing the device/user identifier 227, an intermediate party (e.g., an intermediate server or entity on the Internet) receiving the beacon request cannot directly identify a user of the client device 102. For example, if the intended final recipient of the device/user identifier 227 is the database proprietor 116, the AME 114 cannot recover identifier information when the device/user identifier 227 is hashed by the client device 102 for decrypting only by the intended database proprietor 116. When the database proprietor 116 receives the device/user identifier 227, the database proprietor 116 can obtain demographic information corresponding to a user of the client device 102 based on the device/user identifier 227 that the database proprietor 116 receives from the client device 102.

Although only a single database proprietor 116 is shown in FIGS. 1 and 2, the impression reporting/collection process of FIGS. 1 and 2 may be implemented using multiple database proprietors. In some such examples, the beacon instructions 208 cause the client device 102 to send beacon/impression requests 226 to numerous database proprietors. For example, the beacon instructions 208 may cause the client device 102 to send the beacon/impression requests 226 to the numerous database proprietors in parallel or in daisy chain fashion. In some such examples, the beacon instructions 208 cause the client device 102 to stop sending beacon/impression requests 226 to database proprietors once a database proprietor has recognized the client device 102. In other examples, the beacon instructions 208 cause the client device 102 to send beacon/impression requests 226 to database proprietors so that multiple database proprietors can recognize the client device 102 and log a corresponding impression. Thus, in some examples, multiple database proprietors are provided the opportunity to log impressions and provide corresponding demographics information if the user of the client device 102 is a subscriber of services of those database proprietors.

In some examples, prior to sending the beacon response 222 to the client device 102, the AME impressions collector 218 replaces site IDs (e.g., URLs) of media provider(s) that served the media 206 with modified site IDs (e.g., substitute site IDs) which are discernable only by the AME 114 to identify the media provider(s). In some examples, the AME impressions collector 218 may also replace a host website ID (e.g., www.acme.com) with a modified host site ID (e.g., a substitute host site ID) which is discernable only by the AME 114 as corresponding to the host website via which the media 206 is presented. In some examples, the AME impressions collector 218 also replaces the media identifier 213 with a modified media identifier 213 corresponding to the media 206. In this way, the media provider of the media 206, the host website that presents the media 206, and/or the media identifier 213 are obscured from the database proprietor 116, but the database proprietor 116 can still log impressions based on the modified values (e.g., if such modified values are included in the beacon request 226), which can later be deciphered by the AME 114 after the AME 114 receives logged impressions from the database proprietor 116. In some examples, the AME impressions collector 218 does not send site IDs, host site IDS, the media identifier 213 or modified versions thereof in the beacon response 222. In such examples, the client device 102 provides the original, non-modified versions of the media identifier 213, site IDs, host IDs, etc. to the database proprietor 116.

In the illustrated example, the AME impression collector 218 maintains a modified ID mapping table 228 that maps original site IDs with modified (or substitute) site IDs, original host site IDs with modified host site IDs, and/or maps modified media identifiers to the media identifiers such as the media identifier 213 to obfuscate or hide such information from database proprietors such as the database proprietor 116. Also in the illustrated example, the AME impressions collector 218 encrypts all of the information received in the beacon/impression request 212 and the modified information to prevent any intercepting parties from decoding the information. The AME impressions collector 218 of the illustrated example sends the encrypted information in the beacon response 222 to the client device 102 so that the client device 102 can send the encrypted information to the database proprietor 116 in the beacon/impression request 226. In the illustrated example, the AME impressions collector 218 uses an encryption that can be decrypted by the database proprietor 116 site specified in the HTTP "302 Found" re-direct message.

Periodically or aperiodically, the impression data collected by the database proprietor 116 is provided to a DP impressions collector 232 of the AME 114 as, for example, batch data. Additional examples that may be used to implement the beacon instruction processes of FIG. 2 are disclosed in U.S. Pat. No. 8,370,489 to Mainak et al. In addition, other examples that may be used to implement such beacon instructions are disclosed in U.S. Pat. No. 6,108,637 to Blumenau.

In the example of FIG. 2, the AME 114 includes the example ratings bias corrector 120 to determine ratings data from the impressions collected by the AME impressions collector 218 and/or obtained by the DP impressions collector 232, and to correct for bias in such ratings data in accordance with the teachings of this disclosure. A block diagram of an example implementation of the ratings bias corrector 120 of FIGS. 1 and/or 2 is illustrated in FIG. 3.

Figure 3:
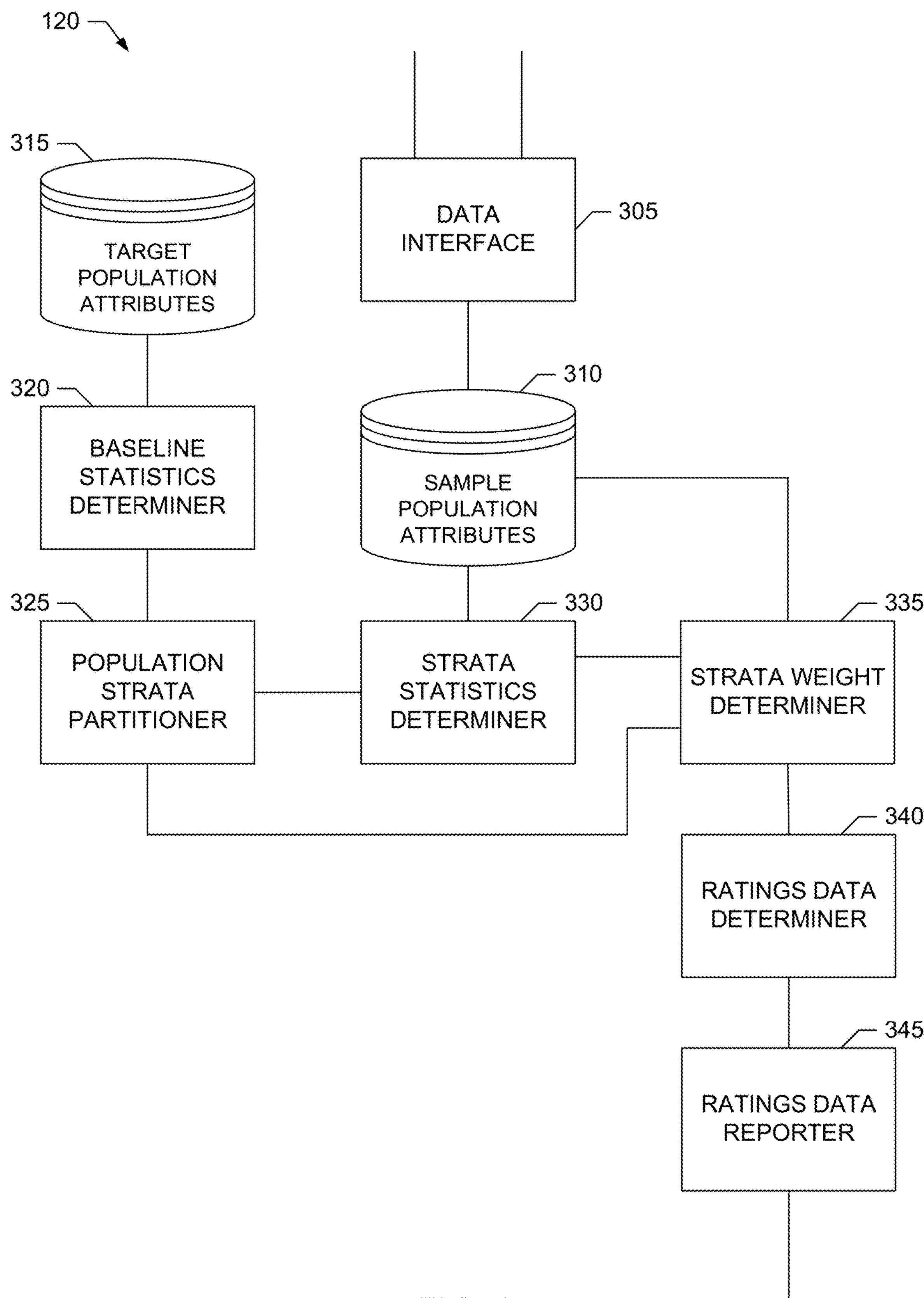
FIG. 3 is a block diagram of an example ratings bias corrector that may be included in the example audience measurement entity of FIGS. 1 and/or 2 to correct for bias in ratings data having interdependencies among demographic statistics in accordance with the teachings of this disclosure.

The example ratings bias corrector 120 of FIG. 3 includes an example data interface 305 to interface with the AME impressions collector 218 and/or the DP impressions collector 232 to obtain demographic impression data specifying population attributes including, for example, media exposure data (e.g., such as numbers of impressions for given media, times and/or duration of media exposure, etc.) and/or purchase activity (e.g., such as numbers of products purchased, numbers of services accessed, etc.), etc., as well as demographic data (e.g., such as age, gender, income, location, mobile phone usage, etc.) for individuals in a sample population (e.g., such as individuals associated with the devices 102 sending the beacon requests 108, 212, 226, etc.). The example data interface 305 can be implemented by any type(s), number(s) and/or combination(s) of communication interfaces, network interfaces, etc., such as the example interface circuit 820 of FIG. 8, which is described in further detail below.

The example ratings bias corrector 120 of FIG. 3 also includes an example sample population attributes storage 310 to store the population attributes included in the demographic impression data collected via the example data interface 305 for the different individuals in the sample population. The example sample population attributes storage 310 may be implemented by any number(s) and/or type(s) of volatile and/or non-volatile memory, storage, etc., or combination(s) thereof, such as the example volatile memory 814 and/or the example mass storage device(s) 828 of FIG. 8, which is described in further detail below.

The example ratings bias corrector 120 of FIG. 3 further includes an example target population attributes storage 315 to store population attributes obtained for a target population of individuals. For example, the target population may correspond to a larger population (e.g., a national population) onto which ratings data determined by the ratings bias corrector 120 for the sample population (e.g., a local population) is to be projected or otherwise applied, or a second population (e.g., associated with a different region than the sample population) that is to be combined with the sample population for which the ratings bias corrector 120 has obtained demographic impression data, etc. In some examples, the population attributes stored in the target population attributes storage 315 for the target population of individuals are obtained from one or more sources, such as one or more surveys, one or more censuses, another ratings campaign performed by the AME 114 and/or a different AME, etc. The example target population attributes storage 315 may be implemented by any number(s) and/or type(s) of volatile and/or non-volatile memory, storage, etc., or combination(s) thereof, such as the example volatile memory 814 and/or the example mass storage device(s) 828 of FIG. 8, which is described in further detail below. Furthermore, the example sample population attributes storage 310 and the example target population attributes storage 315 may be implemented by the same or different volatile and/or non-volatile memory, storage, etc.

The example ratings bias corrector 120 of FIG. 3 also includes an example baseline statistics determiner 320 to determine a set of baseline demographic statistics for the target population from the population attributes stored in the example target population attributes storage 315. (The term "baseline" is used to indicate that this set of demographics statistics is known or otherwise ascertainable for the target population.) In the illustrated example of FIG. 3, the set of baseline demographic statistics determined by the baseline statistics determiner 320 correspond to probabilities and/or conditional probabilities of individuals of the target population belonging to different demographic classifications (e.g., different demographic groups) of interest represented by the population attributes stored in the example target population attributes storage 315. In some examples, the example baseline statistics determiner 320 determines the probabilities of the target population individual belonging to different demographic classification by counting the number of individuals having attributes associated with a given demographic classification, and then dividing the count by the total number of individuals in the target population. In some examples, the example baseline statistics determiner 320 further combines such probabilities to determine conditional probabilities representing, for example, the probability that individuals of the target population belong to one or more demographic classifications given that the individuals belong to one or more other demographic classifications.

Table 1 illustrates an example set of baseline demographic statistics capable of being determined by the example baseline statistics determiner 320 for a target population (corresponding to the second column of the table). The example set of baseline demographic statistics in Table 1 include statistics corresponding to the probability of an individual being male, P(Male), the probability of an individual being female, P(Female), the probability of an individual being male given the individual is a mobile phone user, P(Male|Mobile Phone), the probability of an individual being female given the individual is a mobile phone user, P(Female|Mobile Phone), the probability of an individual being a mobile phone user given the individual is male, P(Mobile Phone|Male), and the probability of an individual being a mobile phone user given the individual is female, P(Mobile Phone|Female). In the illustrated example, the baseline statistics determiner 320 determines a value for P(Male) by processing the population attributes stored in the example target population attributes storage 315 to count the number of individuals who are male, and then dividing by the total number of individuals in the sample population. In other words, the baseline statistics determiner 320 determines a value for P(Male) by processing the population attributes stored in the example target population attributes storage 315 to determine a percentage of the individuals who are male. Similarly, the example baseline statistics determiner 320 determines a value for P(Female) by processing the population attributes stored in the example target population attributes storage 315 to determine a percentage of the individuals who are female. The example baseline statistics determiner 320 determines a value for P(Mobile Phone|Male) by processing the population attributes stored in the example target population attributes storage 315 to determine the percentage of individuals who are both male and are mobile phone users, and then dividing by the value of P(Male). Similarly, the example baseline statistics determiner 320 determines a value for P(Mobile Phone|Female) by processing the population attributes stored in the example target population attributes storage 315 to determine the percentage of individuals who are both female and are mobile phone users, and then dividing by the value of P(Female). The example baseline statistics determiner 320 determines a value for P(Male|Mobile Phone) by processing the population attributes stored in the example target population attributes storage 315 to determine the percentage of individuals who are male and mobile phone users and to determine the percentage of individuals who are mobile phone users, and then dividing the first value by the second value. Similarly, the example baseline statistics determiner 320 determines a value for P(Female|Mobile Phone) by processing the population attributes stored in the example target population attributes storage 315 to determine the percentage of individuals who are female and mobile phone users and to determine the percentage of individuals who are mobile phone users, and then dividing the first value by the second value. Of course, additional or alternative statistics could be included in the set of baselines demographic statistics determined by the baseline statistics determiner 320.

TABLE 1

| Baseline Demographic Statistic | Target Population Value | Sample Population Value |
|---|---|---|
| P(Male) | 34.78% | 75.02% |
| P(Female) | 65.22% | 24.98% |
| P(Male \| Mobile Phone) | 27.12% | 74.99% |
| P(Female \| Mobile Phone) | 72.88% | 25.01% |
| P(Mobile Phone \| Male) | 40.61% | 20.60% |
| P(Mobile Phone \| Female) | 58.20% | 20.63% |

Table 1 also illustrates a corresponding set of baseline demographic statistics (corresponding to the third column of the table) capable of being determined for a sample population from the population attributes stored in the example sample population attributes storage 310. In the illustrated example of Table 1, the set of baseline demographic statistics for the sample population is determined without the benefit of bias correction as disclosed herein. Accordingly, the example first set of baseline demographic statistics listed in Table 1 for the sample population exhibits bias relative to the corresponding example second set of baseline demographic statistics listed in Table 1 for the target population.

For example, the two sets of baseline demographic statistics indicate that the sample population includes an oversampling of males and an undersampling of females relative to the target population.

To implement rating bias correction in accordance with the teachings of this disclosure, the example ratings bias corrector 120 of FIG. 3 includes an example population strata partitioner 325, an example strata statistics determiner 330 and an example strata weight determiner 335. The population strata partitioner 325 of the illustrated example accesses information specifying a partition of the sample population (e.g., which includes the individuals for which population attributes are stored in the example sample population attributes storage 310) into a set of population strata (also referred to as population partitions) having strata demographic statistics capable of being combined to determine a set of baseline demographic statistics for the sample population that corresponds to the set of baseline demographic statistics determined by the baseline statistics determiner 320 for the target population. In the illustrated example of FIG. 3, for a given set of population strata specified in information accessed by the population strata partitioner 325, the example strata statistics determiner 330 processes the population attributes stored in the example sample population attributes storage 310 to determine the strata demographic statistics for respective ones of the set of population strata. In some examples, the strata demographic statistics represent numbers of individuals from the sample population belonging to respective stratum in the set of population strata. Accordingly, in such examples, to determine the strata demographic statistic for a particular population stratum, the strata statistics determiner 330 processes the population attributes stored in the example sample population attributes storage 310 to count the number of sample population individuals belonging to the particular stratum.

In some examples, the set of population strata specified in the information accessed by the population strata partitioner 325 is a mutually exclusive set (meaning that an individual of the sample population belongs to only one of the strata) that covers the sample population (meaning that strata, in combination, include all individuals of the sample population). Furthermore, in some examples, this set of population strata is a minimum set of mutually exclusive strata or, in other words, the set of population strata includes the fewest number of strata that are mutually exclusive and capable of covering the sample population. For example, if the strata demographic statistics represent numbers of individuals from the sample population belonging to respective stratum in the set of population strata, then the population strata partitioner 325 accesses information specifying a set of strata (e.g., such as a minimum set of mutually exclusive strata) such that the strata demographic statistics representing the numbers of sample population individuals belonging to the different strata can be combined (e.g., in various combinations) to yield a set of baseline demographics statistics of the sample population that corresponds to the set of baseline demographic statistics determined by the baseline statistics determiner 320 for the target population. In some examples, the population strata partitioner 325 obtains the information specifying a set of strata capable of being used to determine a particular set of baseline demographics statistics from configuration information entered by a user to specify the set of strata. In some examples, the population strata partitioner 325 utilizes one or more set partitioning algorithms to determine the information specifying the set of strata.

Table 2 illustrates an example set of strata capable of being specified in information accessed by the example population strata partitioner 325 for the example set of baseline demographic statistics listed in Table 1. The example set of strata represented in Table 2 include the following four (4) strata: a first stratum including males who are not mobile phone users and having a corresponding strata demographic statistic labeled "A" in the table, a second stratum including males who are mobile phone users and having a corresponding strata demographic statistic labeled "B" in the table, a third stratum including females who are not mobile phone users and having a corresponding strata demographic statistic labeled "C" in the table, and a fourth stratum including females who are mobile phone users and having a corresponding strata demographic statistic labeled "D" in the table.

TABLE 2

| Strata | Strata Statistic |
|---|---|
| Male + Not Mobile Phone User | A |
| Male + Mobile Phone User | B |
| Female + Not Mobile Phone User | C |
| Female + Mobile Phone User | D |

Table 3 illustrates an example set of strata demographic statistics capable of being determined by the strata statistics determiner 330 for the example set of strata listed in Table 2. In the example of Table 3, the strata demographic statistics correspond to the respective numbers of individuals of the sample population belonging to the different strata.

TABLE 3

| Strata | Strata Statistic (Subpopulation Size) |
|---|---|
| Male + Not Mobile Phone User | A = 595,622 individuals |
| Male + Mobile Phone User | B = 154,530 individuals |
| Female + Not Mobile Phone User | C = 198,315 individuals |
| Female + Mobile Phone User | D = 51,533 individuals |

Table 4 illustrates how the example set of baseline demographic statistics listed in Table 1 can be determined for the sample population from the example set of strata demographic statistics listed in Table 3 for the example set of strata listed in Table 2. The example of Table 4 illustrates that the example set of baseline demographic statistics listed in Table 1 can be determined for the sample population from the example set of strata demographic statistics using mathematical expressions involving division of a numerator term by a denominator term. The numerator and denominator terms for the different baseline demographic statistics in Table 1 are computed from different ones or combinations of the strata demographic statistics as shown in Table 4.

TABLE 4

| Baseline Demographic Statistic | Numerator | Denominator |
|---|---|---|
| P(Male) | A + B | A + B + C + D |
| P(Female) | C + D | A + B + C + D |
| P(Male \| Mobile Phone) | B | B + D |
| P(Female \| Mobile Phone) | D | B + D |
| P(Mobile Phone \| Male) | B | A + B |
| P(Mobile Phone \| Female) | D | C + D |

The example ratings bias corrector 120 of FIG. 3 further includes the example strata weight determiner 335 to determine a set of weights corresponding respectively to the set of population strata. In the illustrated example of FIG. 3, the strata weight determiner 335 determines the set of weights to reduce bias between the set of baseline demographic statistics determined by the baseline statistics determiner 320 for the target population and the set of baseline demographic statistics for the sample population, when the set of weights is applied to the strata demographic statistics to determine the set of baseline demographic statistics for the sample population. In other words, the strata weight determiner 335 of the illustrated example determines the set of weights corresponding respectively to the set of population strata such that, when the respective weights are applied to (e.g., used to scale) the strata demographic statistics of the respective population strata, the bias between the set of baseline demographic statistics capable of being determined from the weighted, strata demographic statistics (e.g., according to the example expressions represented in Table 4) and the set of baseline demographic statistics determined by the baseline statistics determiner 320 for the target population is reduced (e.g., is minimized).

Figure 4:
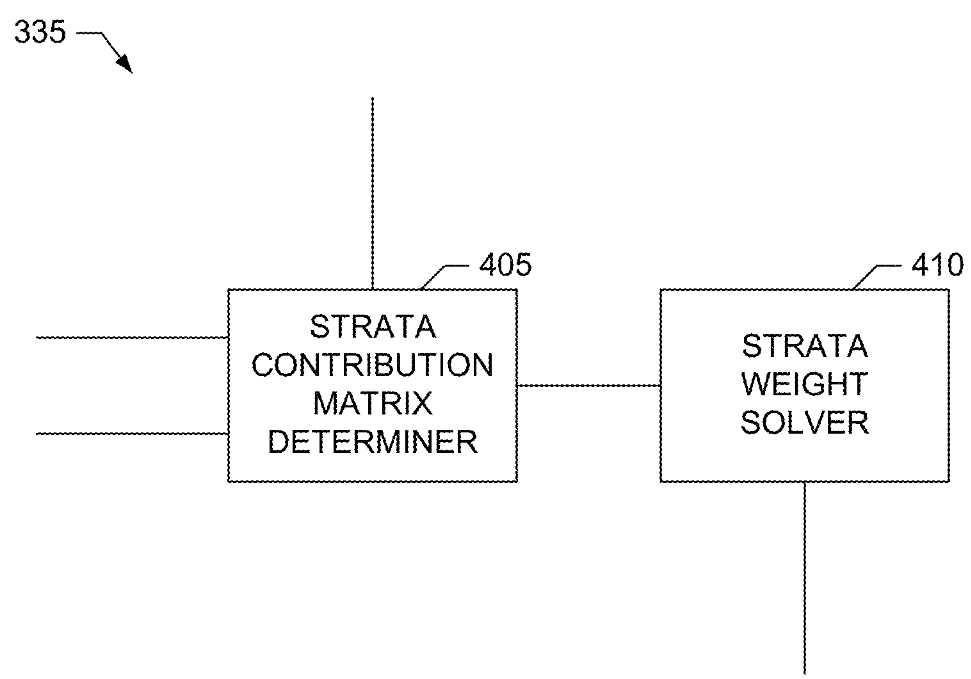
FIG. 4 is a block diagram of an example strata weight determiner that may be used to implement the example ratings bias corrector of FIG. 3

An example implementation of the strata weight determiner 335 of FIG. 3 is illustrated in FIG. 4. The example strata weight determiner 335 of FIG. 4 determines the set of weights for a set of population strata based on a matrix, C, having elements that correspond to different possible pairings of ones of the strata demographic statistics and ones of the set of baseline demographic statistics. For example, such a matrix, C, has matrix elements ($C_{ij}$), where the variable i is an index over the set of baseline demographic statistics (e.g., such as the examples of Tables 1 and/or 4), and j is an index over the set of population strata (e.g., such as the examples of Tables 2 and/or 3). In some such examples, the matrix element ($C_{ij}$) for a given i and j corresponds to a pairing of the $i^{th}$ strata demographic statistic and the $j^{th}$ baseline demographic statistic, and has a value determined based on a contribution of the $i^{th}$ strata demographic statistic to the $j^{th}$ baseline demographic statistic (e.g., corresponding to the example of Table 4). As such, the matrix, C, is also referred to herein as the strata contribution matrix.

Accordingly, the example strata weight determiner 335 of FIG. 4 includes an example strata contribution matrix determiner 405 to form the strata contribution matrix, C. In the example of FIG. 4, the strata contribution matrix determiner 405 determines the strata contribution matrix, C, based on the set of population strata, the corresponding set of strata demographic statistics, the set of baseline demographic statistics, and the values of the set of baseline demographic statistics for the target population. For example, the strata contribution matrix determiner 405 can determine the matrix elements, ($C_{ij}$), of the strata contribution matrix, C, according to Equations 1, which is:

$$(C_{ij})=k_i\times([N_{ij}]-p_i[D_{ij}])\lambda S_j \qquad \text{Equation 1}$$

In Equation 1, i is an index over the baseline demographic statistics, j is an index over the population strata, $k_i$ is an importance weight for the $i^{th}$ baseline demographic statistic (e.g., having a value of 1 or some other value), $[N_{ij}]$ equals 1 if the $i^{th}$ baseline demographic statistic can be calculated using the $j^{th}$ strata demographic statistic as a numerator term and equals 0 otherwise (e.g., according to the example of Table 4), $[D_{ij}]$ equals 1 if the $i^{th}$ baseline demographic statistic can be calculated using the $j^{th}$ strata demographic statistic as a denominator term and equals 0 otherwise (e.g., according to the example of Table 4), $p_i$ is value of the $i^{th}$ baseline demographic statistic for the target population (e.g., such as the values included in the second column of the example of Table 1), and $S_j$ is value of the strata demographic statistic for the $j^{th}$ population strata of the sample population (e.g., such as the number of individuals in the sample population belonging to the $j^{th}$ strata, for example, the values included in the example of Table 3).

Table 5 illustrates different possible values for the inner term ($[N_{ij}]-p_i[D_{ij}]$) of Equation 1 depending on whether the $j^{th}$ strata demographic statistic appears in the numerator term, the denominator term, both the numerator and denominator terms, or neither of the numerator and denominator terms used to calculate the $i^{th}$ baseline demographic statistic for the sample population from the set of strata demographic statistic (e.g., according to Table 4, as an example).

TABLE 5

| Value of ($[N_{ij}] - p_j[D_{ij}]$) from Equation 1 | Condition Causing Listed Value |
|---|---|
| 0 | $j^{th}$ strata demographic statistic in neither the numerator nor the denominator terms used to calculate $i^{th}$ baseline demographic statistic for the sample population |
| 1 | $j^{th}$ strata demographic statistic in only the numerator term used to calculate $i^{th}$ baseline demographic statistic for the sample population |
| $-p_i$ | $j^{th}$ strata demographic statistic in only the denominator term used to calculate $i^{th}$ baseline demographic statistic for the sample population |
| $1 - p_i$ | $j^{th}$ strata demographic statistic in both the numerator and the denominator terms used to calculate $i^{th}$ baseline demographic statistic for the sample population |

As mentioned above, the value of k, in Equation 1 is an importance weight for the $i^{th}$ baseline demographic statistic. In some examples, the value of $k_i$ defaults to a value of 1. In some examples, the value of $k_i$ is adjustable (e.g., based on a user configuration input) to, for example, emphasize or deemphasize the importance of one or more of the strata and/or one or more of the baseline demographic statistics in the computation of the set of weights.

The example strata weight determiner 335 of FIG. 4 also includes an example strata weight solver 410 to determine the set of weights to be used to scale the strata demographic statistics (and/or other population attributes) associated with the set of population strata. In the illustrated example of FIG. 4, the strata weight solver 410 determines the set of weights, ($w_j$), for the set of population strata, j, based on the strata contribution matrix, C, determined by the strata contribution matrix determiner 405. In some examples, the strata weight solver 410 determines the set of weights to minimize an expression based on multiplying the matrix strata contribution matrix, C, and a vector, $w=(w_j)$, of the weights subject to a constraint that the weights have values greater than or equal to one. An example of such an expression, L, is illustrated by Equation 2, which is:

$$\text{minimize } L=\|Cx\|w_2^2 \text{subject to } 1\leq(w_j)<\infty \qquad \text{Equation 2}$$

In Equation 2, the expression, L, corresponds to the squared L2 norm of the strata contribution matrix, C, and the strata weight vector, $w=(w_j)$, but subject to a constraint that the weights have values greater than or equal to one. In some examples, the strata weight solver 410 implements Equation 2 by arranging the strata weights as the vector, $w=(w_j)$, and then determining the values, $w_1$, of the weights by solving, using any appropriate numerical technique, a constrained linear least squares problem defined by the expression, L, and the constraint given in Equation 2.

In some examples, the strata weight determiner 335 determines the values, $w_j$, of the strata weights by solving, using any appropriate numerical technique, a linear least squares problem defined by the expression L of Equation 2, but without the constraint that the weights have values greater than or equal to one, or with a different constraint on or scaling of the weights. This is because the relative values, $w_j$, of the weights for different strata, not the actual values of these weights, yield the desired bias reduction. For example, for three (3) strata indexed j=1, 2, 3, weight values ($w_1$, $w_2$, $w_3$) of (1, 3, 10), (2, 6, 20), (100, 300, 1000) or (0.1, 0.3, 1) might yield the same bias reduction because these different sets of weights have the same relative relationships between different strata (e.g., $w_2=3\times w_1$ and $w_3=10\times w_1$ for each of these example sets of strata weights). However, in some examples, it may be convenient to constrain the weights to have values greater than or equal to one (e.g., according to Equation 2), or some other value (e.g., by replacing the value "1" in Equation 2 with another value).

Table 6 illustrates an example set of strata weights, $w=(w_j)$, j=1, . . . , 4, capable of being determined by the strata weight solver 410 for the example set of strata, j=1, . . . , 4, and corresponding example strata demographic statistics listed in Table 3.

TABLE 6

| Strata | Strata Statistic (Subpopulation Size) | Strata Weight |
|---|---|---|
| Male + Not Mobile Phone User | A = 595,622 individuals | 1.000 |
| Male + Mobile Phone User | B = 154,530 individuals | 2.636 |
| Female + Not Mobile Phone User | C = 198,315 individuals | 3.964 |
| Female + Mobile Phone User | D = 51,533 individuals | 21.240 |

Table 7 illustrates that the example strata weights listed in Table 6 can correct for the bias between the set of baseline demographic statistics for the target population and the corresponding set of baseline demographic statistics determined for the target population from the strata demographic statistics.

TABLE 7

| Baseline Demographic Statistic | Target Population Value | Sample Population Value (Without Weighting) | Sample Population Value (With Weighting) |
|---|---|---|---|
| P(Male) | 34.78% | 75.02% | 34.78% |
| P(Female) | 65.22% | 24.98% | 65.22% |
| P(Male \| Mobile Phone) | 27.12% | 74.99% | 27.12% |
| P(Female \| Mobile Phone) | 72.88% | 25.01% | 72.88% |
| P(Mobile Phone \| Male) | 40.61% | 20.60% | 40.61% |
| P(Mobile Phone \| Female) | 58.20% | 20.63% | 58.20% |

For example, with reference to Table 4, the value of the last baseline demographic statistic listed in Table 7 (i.e., P(Mobile Phone|Female)) is calculated for the sample population from the strata statistics listed in Tables 2 and 3 using Equation 3, which is:

$$P(\text{Mobile Phone} \mid \text{Female}) = \frac{D}{C+D}$$

Evaluating Equation 3 without weighting yields $$P(\text{Mobile Phone} \mid \text{Female}) = \frac{51{,}533}{198{,}315 + 51{,}533} = 20.63\%$$

which is the sample population value (without weighting) listed in Table 7. However, evaluating Equation 3 with weighting using the weights of Table 6 yields $$P(\text{Mobile Phone} \mid \text{Female}) = \frac{51{,}533 \times 21.240}{198{,}315 \times 3.9640 + 51{,}533 \times 21.240} = 58.20\%$$

which is the sample population value (with weighting) listed in Table 7.

Returning to FIG. 3, the example ratings bias corrector 120 illustrated therein also includes an example ratings determiner 340 to adjust, based on the set of weights determined by the example strata weight determiner 235, attributes associated with individuals of the sample population (e.g., as stored in the example sample population attributes storage 310) to determine ratings data. For example, the ratings determiner 340 can use the weights determined by the example strata weight determiner 235 to scale the contribution of attribute(s) for an individual in the sample population when determining ratings data associated with the attribute(s) to account for the bias between the sample population and the target population. In some examples, if a first individual of the sample population is included in a first one of the population strata, and a second individual of the sample population is included in a second one of the population strata, the ratings determiner 340 adjusts the attributes associated with the individuals (e.g., the first and second individual) of sample population to determine the ratings data by scaling a contribution of an attribute associated with the first individual by a first one of the weights corresponding to the first population strata to determine a first scaled attribute contribution. In such examples, the ratings determiner 340 also scales a contribution of an attribute associated with the second individual by a second one of the weights corresponding to the second population strata to determine a second scaled attribute contribution. In such examples, the ratings determiner 340 further combines (e.g., adds, multiples, etc.) the first scaled attribute contribution and the second scaled attribute contribution to determine the ratings data.

For example, and with reference to the example of Table 6, if an attribute corresponds to whether an individual was exposed to given media, the ratings determiner 340 may scale (e.g., or, in other words, emphasize or de-emphasize) the contribution (e.g., presence of absence of exposure to the given media) of a first individual from the first strata (e.g., Male+Not Mobile Phone User) by the weight for that first strata (e.g., $w_1$=1.000) and may scale (e.g., or, in other words, emphasize or de-emphasize) the contribution (e.g., presence of absence of exposure to the given media) of a second individual from the second strata (e.g., Male+Mobile Phone User) by the weight for that second strata (e.g., $w_2$=2.636) when determining the ratings data quantifying viewership of the given media. In other words, in such an example, the ratings determiner 340 may count the first individual's exposure (or lack thereof) to the given media as corresponding to 1.000 individuals having the same demographic characteristics as the first individual, but may count the second individual's exposure (or lack thereof) to the given media as corresponding to 2.636 individuals having the same demographic characteristics as the second individual.

The example ratings bias corrector 120 of FIG. 3 further includes an example ratings data reporter 345 to report the ratings data determined by the example ratings determiner 340 to one or more recipients. In some examples, the ratings data reporter 345 transmits the ratings data electronically and/or optically from the ratings bias corrector 120 to a receiving device via one or more communication networks. As such, in some examples, the example ratings data reporter 345 can be implemented by any type(s), number(s) and/or combination(s) of communication interfaces, network interfaces, etc., such as the example interface circuit 820 of FIG. 8, which is described in further detail below.

Although the example ratings bias corrector 120 of FIGS. 1-4 has been described primarily from the perspective of determining ratings data based on logged media impressions for online media, the example methods, apparatus, systems and articles of manufacture (e.g., physical storage media) disclosed herein to correct for bias in ratings data having interdependencies among demographic statistics are not limited thereto. On the contrary, the example ratings bias corrector 120 can determine ratings data from any type of population sample data having interdependencies among demographic statistics. For example, the example ratings bias corrector 120 can determine ratings data for population sample data that logs and/or otherwise represents population attributes such as, but not limited to, media impressions, products purchased, services accessed, etc.

While example manners of implementing the ratings bias corrector 120 is illustrated in FIGS. 1-4, one or more of the elements, processes and/or devices illustrated in FIGS. 1-4 may be combined, divided, re-arranged, omitted, eliminated and/or implemented in any other way. Further, the example data interface 305, the example sample population attributes storage 310, the example target population attributes storage 315, the example baseline statistics determiner 320, the example population strata partitioner 325, the example strata statistics determiner 330, the example strata weight determiner 335, the example ratings determiner 340, the example ratings data reporter 345, the example strata contribution matrix determiner 405, the example strata weight solver 410 and/or, more generally, the example ratings bias corrector 120 of FIGS. 1-4 may be implemented by hardware, software, firmware and/or any combination of hardware, software and/or firmware. Thus, for example, any of the example data interface 305, the example sample population attributes storage 310, the example target population attributes storage 315, the example baseline statistics determiner 320, the example population strata partitioner 325, the example strata statistics determiner 330, the example strata weight determiner 335, the example ratings determiner 340, the example ratings data reporter 345, the example strata contribution matrix determiner 405, the example strata weight solver 410 and/or, more generally, the example ratings bias corrector 120 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example ratings bias corrector 120, the example data interface 305, the example sample population attributes storage 310, the example target population attributes storage 315, the example baseline statistics determiner 320, the example population strata partitioner 325, the example strata statistics determiner 330, the example strata weight determiner 335, the example ratings determiner 340, the example ratings data reporter 345, the example strata contribution matrix determiner 405 and/or the example strata weight solver 410 is/are hereby expressly defined to include a tangible computer readable storage device or storage disk such as a memory, a digital versatile disk (DVD), a compact disk (CD), a Blu-ray disk, etc. storing the software and/or firmware. Further still, the example ratings bias corrector 120 may include one or more elements, processes and/or devices in addition to, or instead of, those illustrated in FIGS. 1-4, and/or may include more than one of any or all of the illustrated elements, processes and devices.

Figure 5:
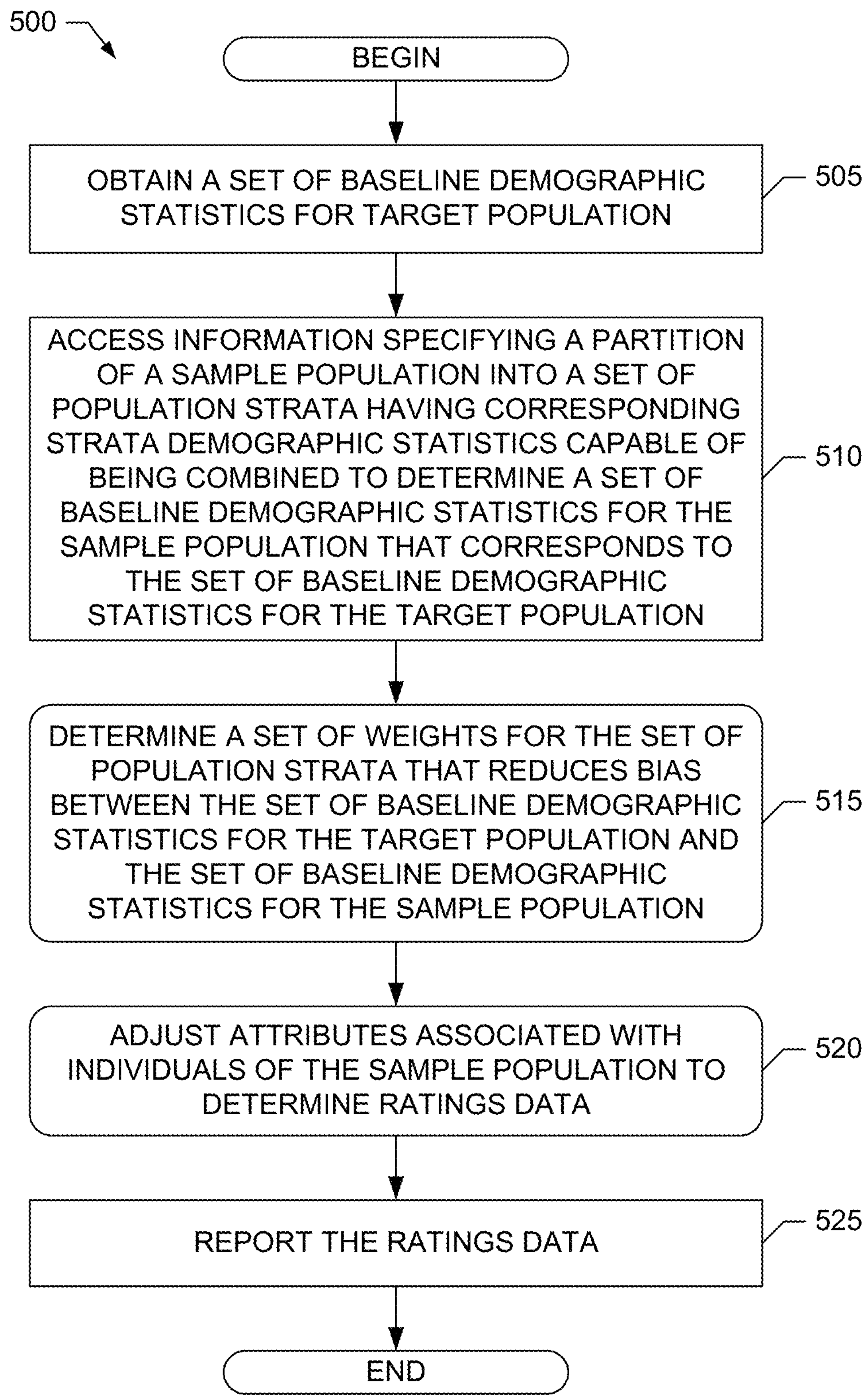
FIGS. 5-7 are flowcharts representative of example machine readable instructions that may be executed to implement the example ratings bias corrector of FIG. 3 and/or the example strata weight determiner of FIG. 4.
Figure 6:
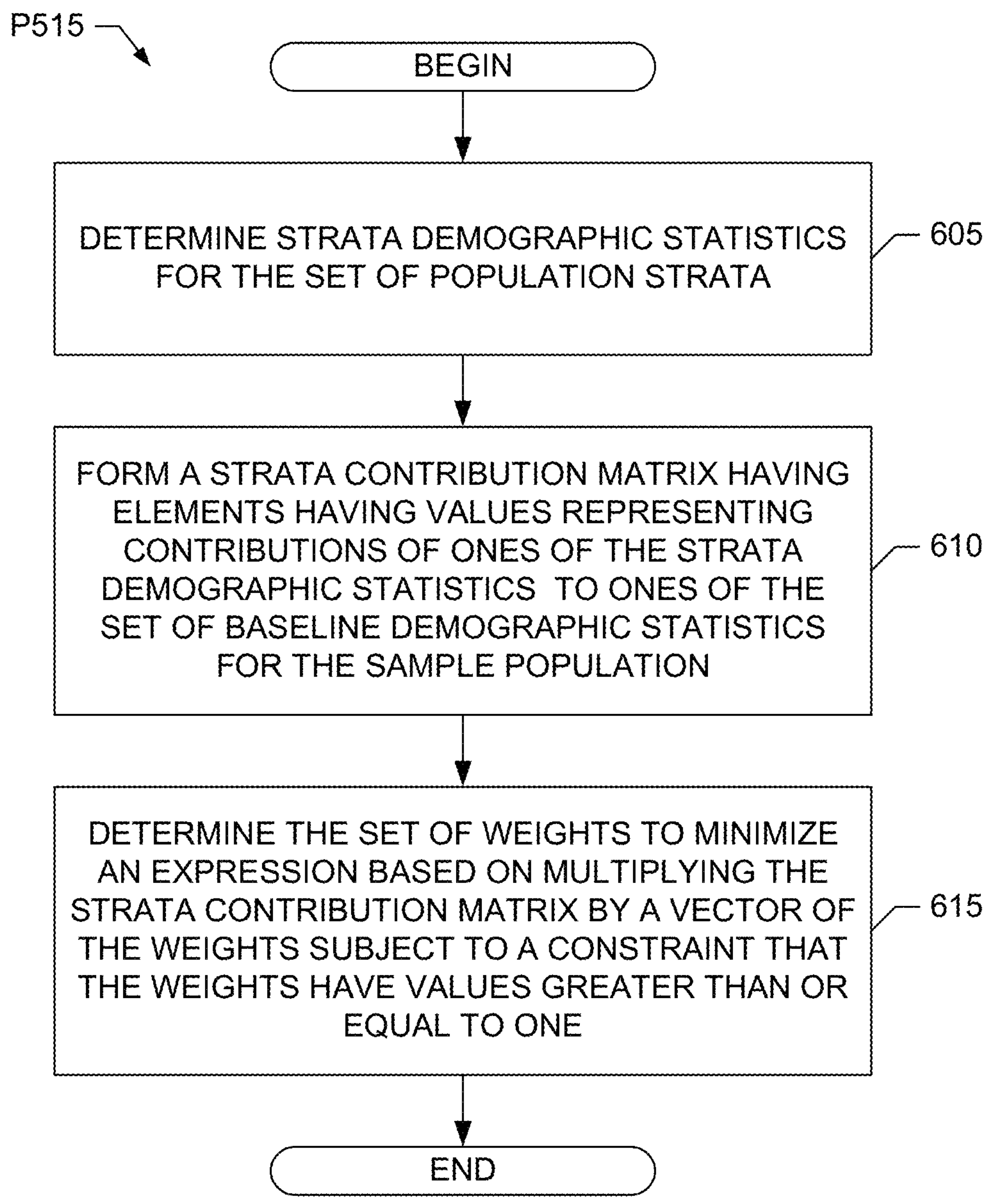
Figure 7:
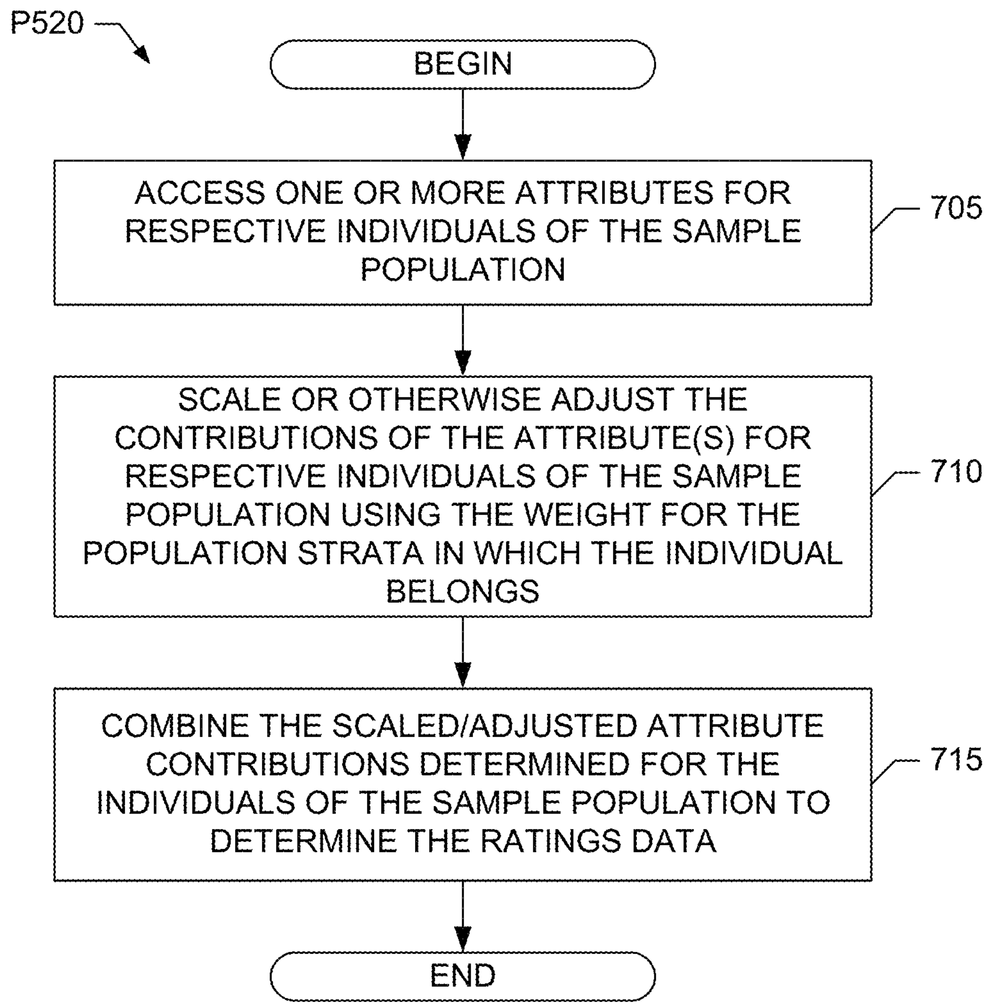

Flowcharts representative of example machine readable instructions for implementing the example ratings bias corrector 120, the example data interface 305, the example sample population attributes storage 310, the example target population attributes storage 315, the example baseline statistics determiner 320, the example population strata partitioner 325, the example strata statistics determiner 330, the example strata weight determiner 335, the example ratings determiner 340, the example ratings data reporter 345, the example strata contribution matrix determiner 405 and/or the example strata weight solver 410 are shown in FIGS. 5-7. In these examples, the machine readable instructions comprise one or more programs for execution by a processor, such as the processor 812 shown in the example processor platform 800 discussed below in connection with FIG. 8. The one or more programs, or portion(s) thereof, may be embodied in software stored on a tangible computer readable storage medium such as a CD-ROM, a floppy disk, a hard drive, a digital versatile disk (DVD), a Blu-ray disk™, or a memory associated with the processor 812, but the entire program or programs and/or portions thereof could alternatively be executed by a device other than the processor 812 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 5-7, many other methods of implementing the example ratings bias corrector 120, the example data interface 305, the example sample population attributes storage 310, the example target population attributes storage 315, the example baseline statistics determiner 320, the example population strata partitioner 325, the example strata statistics determiner 330, the example strata weight determiner 335, the example ratings determiner 340, the example ratings data reporter 345, the example strata contribution matrix determiner 405 and/or the example strata weight solver 410 may alternatively be used. For example, with reference to the flowcharts illustrated in FIGS. 5-7, the order of execution of the blocks may be changed, and/or some of the blocks described may be changed, eliminated, combined and/or subdivided into multiple blocks.

As mentioned above, the example processes of FIGS. 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-7 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 500 that may be executed to implement the example ratings bias corrector 120 of FIGS. 1-4 is represented by the flowchart shown in FIG. 5. With reference to the preceding figures and associated written descriptions, the example program 500 of FIG. 5 begins execution at block 505 at which the example baseline statistics determiner 320 of the ratings bias corrector 120 determines a set of baseline demographic statistics for a target population, as disclosed above. At block 510, the example population strata partitioner 325 of the ratings bias corrector 120 accesses, as disclosed above, information specifying a partition of individuals of a sample population into a set of population strata having corresponding strata demographic statistics capable of being combined to determine a set of baseline demographic statistics for the sample population that corresponds to the set of baseline demographic statistics obtained at block 505 for the target population.

At block 515, the example strata statistics determiner 330 and the example strata weight determiner 335 of the ratings bias corrector 120 determine, as disclosed above, a set of strata weights for the set of population strata obtained at block 515. The set of strata weights determined at block 515 reduces bias between the set of baseline demographic statistics obtained at block 505 for the target population and a corresponding set of baseline demographic statistics capable of being determined from strata demographic statistics associated with the strata obtained at block 510. An example program capable of performing the processing at block 515 is illustrated in FIG. 6, which is described in further detail below.

At block 520, the example ratings determiner 340 of the ratings bias corrector 120 adjusts, based on the set of weights obtained at block 515 and as disclosed above, attributes associated with individuals of the sample population to determine ratings data. An example program capable of performing the processing at block 520 is illustrated in FIG. 7, which is described in further detail below. At block 525, the example ratings data reporter 345 of the ratings bias corrector 120 reports the ratings data obtained at block 520 to one or more recipients, as disclosed above.

An example program P515 that may be executed to implement the example strata statistics determiner 330 of FIG. 3 and/or the example strata weight determiner 335 of FIGS. 3 and/or 4, and/or to perform the processing at block 515 of FIG. 5, is represented by the flowchart shown in FIG. 6. With reference to the preceding figures and associated written descriptions, the example program P515 of FIG. 6 begins execution at block 605 at which the example strata statistics determiner 330 determines, as disclosed above, strata demographic statistics for a respective set of population strata into which a sample population has been partitioned. At block 610, the example strata contribution matrix determiner 405 of the strata weight determiner 335 forms, as disclosed above, the strata contribution matrix, C, which has elements having values (e.g., corresponding to Equation 1) representing contributions of ones of the strata demographic statistics obtained at block 605 to ones of a set of baseline demographic statistics capable of being determined for the sample population (e.g., and which correspond to a set of baseline demographic statistics known for a target population). At block 615, the example strata weight solver 410 of the strata weight determiner 335 determines, as disclosed above, a set of strata weights corresponding to the set of strata into which the sample population has been partitioned. At block 615, the example strata weight solver 410 determines the set of weights to reduce (e.g., minimize) an expression (e.g., corresponding to Equation 2) based on multiplying the strata contribution matrix, C, by a vector, w, of the weights, and subject to a constraint that the weights have values greater than or equal to one. In the illustrated example, the program P515 uses the strata contribution matrix, C, to determine the weights, w, in a single pass or, in other words, without the need to perform multiple processing iterations to adjust the weights, w, to correct for errors (e.g., increased biases) introduced by prior processing iterations.

An example program P520 that may be executed to implement the example ratings determiner 340 of FIG. 3, and/or to perform the processing at block 520 of FIG. 5, is represented by the flowchart shown in FIG. 7. With reference to the preceding figures and associated written descriptions, the example program P520 of FIG. 7 begins execution at block 705 at which the ratings determiner 340 accesses (e.g., from the example sample population attributes storage 310) one or more attributes for respective individuals of the sample population. At block 710, the ratings determiner 340 scales, or otherwise adjusts, the contributions of the attribute(s) accessed for respective individuals of the sample population using the set of strata weights determined for the set of population strata into which the sample population has been partitioned, as disclosed above. For example, at block 710, the ratings determiner 340 scales the contribution of an attribute associated with a first individual of the sample population by the particular strata weight corresponding to the particular population stratum in which the first individual belongs. Similarly, at block at block 710, the ratings determiner 340 scales the contribution of an attribute associated with a second individual of the sample population by the particular strata weight corresponding to the particular population stratum in which the second individual belongs (which may be same as or different from the population stratum in which the first individual belongs). At block 715, the ratings determiner 340 combines, as disclosed above, the scaled (or otherwise adjusted) attribute contributions determined at block 710 for the individual of the sample population to determine ratings data representative of the sample population.

Figure 8:
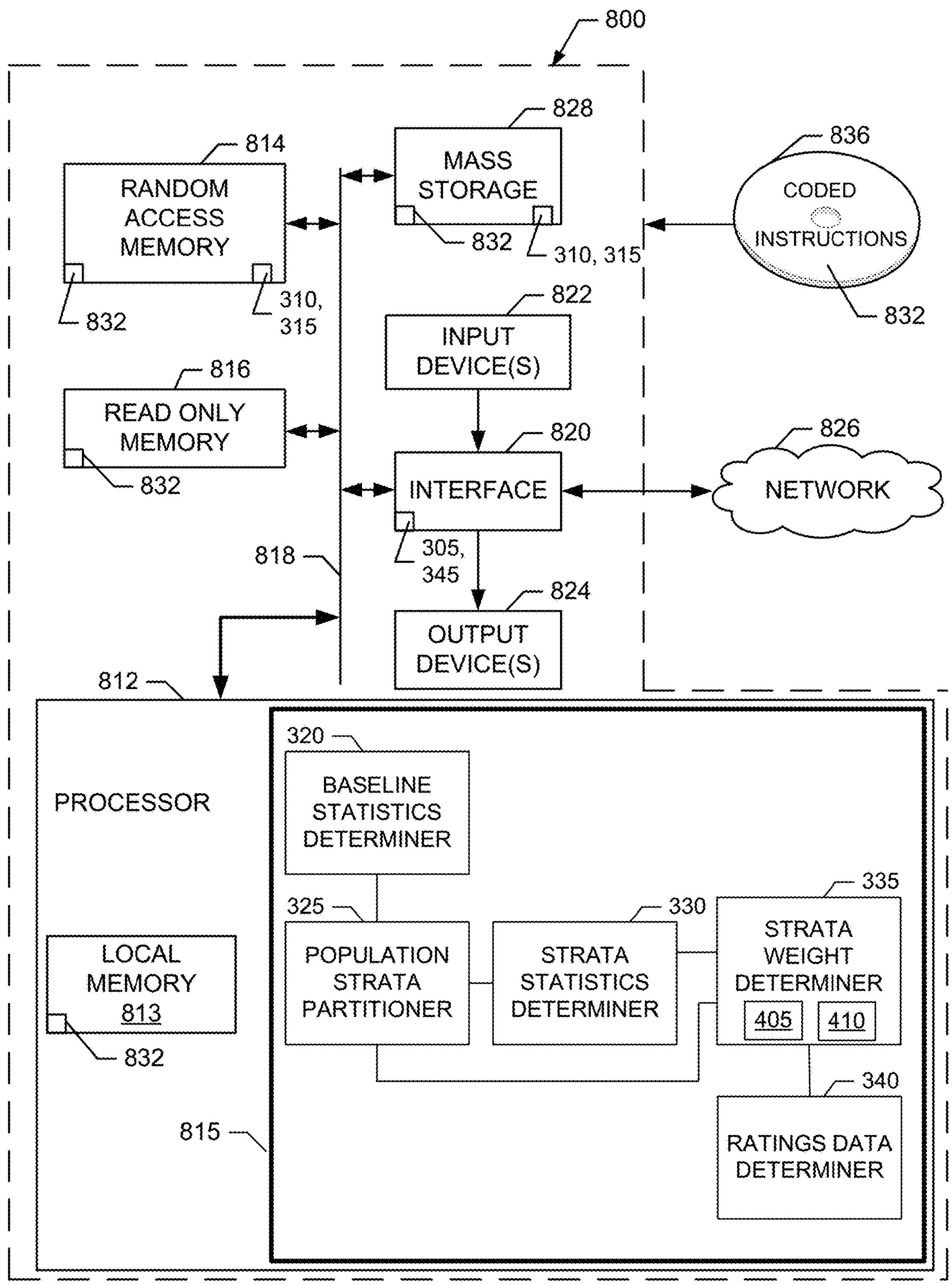
FIG. 8 is a block diagram of an example processor platform structured to execute the example machine readable instructions of FIGS. 5, 6 and/or 7 to implement the example ratings bias corrector of FIG. 3 and/or the example strata weight determiner of FIG. 4.

FIG. 8 is a block diagram of an example processor platform 800 capable of executing the instructions of FIGS. 5, 6 and/or 7 to implement the example ratings bias corrector 120 of FIGS. 1-4. The processor platform 800 can be, for example, a server, a personal computer, a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 includes one or more example processing cores 815 configured via example instructions 832, which include the example instructions of FIGS. 5, 6 and/or 7, to implement the example baseline statistics determiner 320, the example population strata partitioner 325, the example strata statistics determiner 330, the example strata weight determiner 335, the example ratings determiner 340, the example strata contribution matrix determiner 405 and/or the example strata weight solver 410 of FIGS. 3 and/or 4.

The processor 812 of the illustrated example includes a local memory 813 (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 800, can allow the user to control the computer system and provide data to the computer using physical gestures, such as, but not limited to, hand or body movements, facial expressions, and face recognition.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.). In the illustrated example of FIG. 8, the interface circuit 820 is also structured to implement one or more of the example data interface 305 and/or the example ratings data reporter 345 of FIG. 3.

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID (redundant array of independent disks) systems, and digital versatile disk (DVD) drives. In some examples, the mass storage device 830 may implement the example sample population attributes storage 310 and/or the example target population attributes storage 315. Additionally or alternatively, in some examples the volatile memory 818 may implement the example sample population attributes storage 310 and/or the example target population attributes storage 315.

Coded instructions 832 corresponding to the instructions of FIGS. 5, 6 and/or 7 may be stored in the mass storage device 828, in the volatile memory 814, in the non-volatile memory 816, in the local memory 813 and/or on a removable tangible computer readable storage medium, such as a CD or DVD 836.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:

memory; and a processor to execute computer readable instructions to:

access first beacon request messages received from a plurality of devices via a network to obtain impression data included in the first beacon request messages, the impression data associated with at least one of access or exposure to media via ones of the plurality of devices;

cause corresponding beacon response messages to be transmitted to the plurality of devices responsive to the first beacon request messages, the beacon response messages to cause the plurality of devices to transmit subsequent second beacon request messages to an online service;

access demographic data associated with the plurality of device from the online service;

process the impression data obtained from the first beacon request messages received from the plurality of devices and the demographic data accessed from the online service to determine attribute data associated with a sample population;

determine a plurality of weights based on a data structure having elements corresponding to pairings of ones of a plurality of demographic partition statistics and ones of a plurality of baseline demographic statistics obtained for a target population, the demographic partition statistics corresponding to a plurality of demographic partitions of the sample population, the demographic partition statistics based on the attribute data, a first element of the data structure to combine a first one of the demographic partition statistics with a first one of the baseline demographic statistics of the target population based on a first value and a second value, the first value based on a numerator term of an expression to calculate a corresponding first one of the baseline demographic statistics of the sample population based on the demographic partition statistics, the second value based on a denominator term of the expression, the weights corresponding respectively to the demographic partitions of the sample population;

adjust the attribute data based on the weights to determine ratings data for the target population; and cause the ratings data to be transmitted via the network to a receiving device different from the plurality of devices.

2. The apparatus of claim 1, wherein the data structure is a matrix.

3. The apparatus of claim 1, wherein respective ones of the demographic partition statistics are based on respective numbers of individuals in the sample population that belong to corresponding ones of the demographic partitions.

4. The apparatus of claim 3, wherein the processor is to determine the demographic partitions to form a mutually exclusive set that covers the sample population.

5. The apparatus of claim 1, wherein the first one of the baseline demographic statistics of the target population is based on a first number of individuals in the target population that have attributes that correspond to a first one of a plurality of different demographic classifications.

6. The apparatus of claim 5, wherein the corresponding first one of the baseline demographic statistics of the sample population is based on a second number of individuals in the sample population that have attributes that correspond to the first one of the different demographic classifications, and the first one of the baseline demographic statistics of the sample population is also computable from the demographic partition statistics based on the expression.

7. The apparatus of claim 1, wherein the processor is to:

set the first value to one or zero based on whether the first one of the demographic partition statistics is included in the numerator term of the expression; and set the second value to one or zero based on whether the first one of the demographic partition statistics is included in the denominator term of the expression.

8. The apparatus of claim 7, wherein the processor is to determine the first element of the data structure based on the first one of the demographic partition statistics, the first one of the baseline demographic statistics of the target population, the first value, the second value and a third value, the third value based on an importance of the first one of the baseline demographic statistics relative to other ones of the baseline demographic statistics.

9. A non-transitory computer readable medium comprising computer readable instructions that, when executed, cause a processor to at least:

access first beacon request messages received from a plurality of devices via a network to obtain impression data included in the first beacon request messages, the impression data associated with at least one of access or exposure to media via ones of the plurality of devices;

cause corresponding beacon response messages to be transmitted to the plurality of devices responsive to the first beacon request messages, the beacon response messages to cause the plurality of devices to transmit subsequent second beacon request messages to an online service;

access demographic data associated with the plurality of device from the online service;

process the impression data obtained from the first beacon request messages from the plurality of devices and the demographic data accessed from the online service to determine attribute data associated with a first population;

determine a plurality of weights based on a matrix having elements corresponding to pairings of ones of a plurality of demographic partition statistics and ones of a plurality of baseline demographic statistics obtained for a second population, the demographic partition statistics corresponding to a plurality of demographic partitions of the first population, the demographic partition statistics based on the attribute data, a first element of the matrix to combine a first one of the demographic partition statistics with a first one of the baseline demographic statistics of the second population based on a first value and a second value, the first value based on a numerator term of an expression to calculate a corresponding first one of the baseline demographic statistics of the first population based on the demographic partition statistics, the second value based on a denominator term of the expression, the weights corresponding respectively to the demographic partitions of the first population;

adjust the attribute data based on the weights to determine ratings data for the second population; and cause the ratings data to be transmitted via the network to a receiving device different from the plurality of devices.

10. The non-transitory computer readable medium of claim 9, wherein respective ones of the demographic partition statistics are based on respective numbers of individuals in the first population that belong to corresponding ones of the demographic partitions.

11. The non-transitory computer readable medium of claim 9, wherein the first one of the baseline demographic statistics of the second population is based on a first number of individuals in the second population that have attributes that correspond to a first one of a plurality of different demographic classifications.

12. The non-transitory computer readable medium of claim 11, wherein the corresponding first one of the baseline demographic statistics of the first population is based on a second number of individuals in the first population that have attributes that correspond to the first one of the different demographic classifications, and the first one of the baseline demographic statistics of the first population is also computable from the demographic partition statistics based on the expression.

13. The non-transitory computer readable medium of claim 9, wherein the instructions cause the processor to:

set the first value to one or zero based on whether the first one of the demographic partition statistics is included in the numerator term of the expression; and set the second value to one or zero based on whether the first one of the demographic partition statistics is included in the denominator term of the expression.

14. The non-transitory computer readable medium of claim 13, wherein the instructions cause the processor to determine the first element of the matrix based on the first one of the demographic partition statistics, the first one of the baseline demographic statistics of the second population, the first value, the second value and a third value, the third value based on an importance of the first one of the baseline demographic statistics relative to other ones of the baseline demographic statistics.

15. A system comprising:

means for determining attribute data for a sample population, the means for determining the attribute data to:

access first beacon request messages received from a plurality of devices via a network to obtain impression data included in the first beacon request messages, the impression data associated with at least one of access or exposure to media via ones of the plurality of devices;

cause corresponding beacon response messages to be transmitted to the plurality of devices responsive to the first beacon request messages, the beacon response messages to cause the plurality of devices to transmit subsequent second beacon request messages to an online service;

access demographic data associated with the plurality of device from the online service; and process the impression data obtained from the first beacon request messages from the plurality of devices and the demographic data accessed from the online service to determine the attribute data for the sample population;

means for determining ratings data for a target population, the means for determining the ratings data to:

determine a plurality of weights based on a matrix having elements corresponding to pairings of ones of a plurality of strata statistics and ones of a plurality of baseline demographic statistics obtained for a target population, the strata statistics corresponding to a plurality of demographic strata of the sample population, the strata statistics based on the attribute data, a first element of the matrix to combine a first one of the strata statistics with a first one of the baseline demographic statistics of the target population based on a first value and a second value, the first value based on a numerator term of an expression to calculate a corresponding first one of the baseline demographic statistics of the sample population based on the strata statistics, the second value based on a denominator term of the expression, the weights corresponding respectively to the demographic strata of the sample population; and adjust the attribute data based on the weights to determine ratings data for the target population; and means for transmitting the ratings data via the network to a receiving device different from the plurality of devices.

16. The system of claim 15, wherein the means for determining the ratings data is to determine the demographic strata to form a mutually exclusive set that covers the sample population, and respective ones of the strata statistics are based on respective numbers of individuals in the sample population that belong to corresponding ones of the demographic strata.

17. The system of claim 15, wherein the first one of the baseline demographic statistics of the target population is based on a first number of individuals in the target population that have attributes that correspond to a first one of a plurality of different demographic classifications.

18. The system of claim 17, wherein the corresponding first one of the baseline demographic statistics of the sample population is based on a second number of individuals in the sample population that have attributes that correspond to the first one of the different demographic classifications, and the first one of the baseline demographic statistics of the sample population is also computable from the strata statistics based on the expression.

19. The system of claim 15, wherein the means for determining the ratings data is to:

set the first value to one or zero based on whether the first one of the strata statistics is included in the numerator term of the expression; and set the second value to one or zero based on whether the first one of the strata statistics is included in the denominator term of the expression.

20. The system of claim 19, wherein the means for determining the ratings data is to determine the first element of the matrix based on the first one of the strata statistics, the first one of the baseline demographic statistics of the target population, the first value, the second value and a third value, the third value based on an importance of the first one of the baseline demographic statistics relative to other ones of the baseline demographic statistics.

* * * * *